United States Patent
Mizoi et al.

(10) Patent No.: US 10,518,685 B2
(45) Date of Patent: Dec. 31, 2019

(54) CONVEYANCE SEAT

(71) Applicant: TS TECH CO., LTD., Asaka-shi, Saitama (JP)

(72) Inventors: Kensuke Mizoi, Tochigi (JP); Naoto Yamauchi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/914,348

(22) Filed: Mar. 7, 2018

(65) Prior Publication Data
US 2018/0257534 A1    Sep. 13, 2018

(30) Foreign Application Priority Data

Mar. 8, 2017  (JP) .................... 2017-043475
Mar. 8, 2017  (JP) .................... 2017-043476
Jul. 28, 2017 (JP) .................... 2017-146858

(51) Int. Cl.
*B60N 2/64*   (2006.01)
*B60N 2/66*   (2006.01)
(Continued)

(52) U.S. Cl.
CPC .............. *B60N 2/99* (2018.02); *B60N 2/0244* (2013.01); *B60N 2/1803* (2013.01); *B60N 2/64* (2013.01);
(Continued)

(58) Field of Classification Search
CPC ........ B60N 2/99; B60N 2/1803; B60N 2/643; B60N 2/646; B60N 2/66; B60N 2/665; B60N 2/914
See application file for complete search history.

(56) References Cited

U.S. PATENT DOCUMENTS 3,713,696 A * 1/1973 Dudley .................... B60N 2/64
                                                    297/452.26
4,718,727 A * 1/1988 Sheppard ............... A47C 7/425
                                                    297/452.26
(Continued)

FOREIGN PATENT DOCUMENTS

DE    19938698 A1 *  2/2001  ........... B60N 2/0276
DE    10039267 A1 *  2/2002  ............... B60N 2/02
(Continued)

*Primary Examiner* — Timothy J Brindley
(74) *Attorney, Agent, or Firm* — Drinker Biddle & Reath LLP

(57) ABSTRACT

Provided is a conveyance seat including a pelvis support member of which a state or the like is adjusted. The conveyance seat includes the pelvis support member configured to support a portion of an occupant's body where a pelvis is positioned and lumbar supports configured to move the pelvis support member. The pelvis support member includes a seat back side support portion positioned behind a back portion of the occupant, a seat cushion side support portion positioned below buttocks of the occupant, and a connection portion that connects the seat back side support portion and the seat cushion side support portion. The lumbar supports are configured to move the pelvis support member so that a position of at least one of the seat back side support portion, the seat cushion side support portion, and the connection portion is changed with respect to the portion where the pelvis is positioned.

20 Claims, 20 Drawing Sheets

(51) Int. Cl.
  *B60N 2/18* (2006.01)
  *B60N 2/90* (2018.01)
  *B60N 2/02* (2006.01)
(52) U.S. Cl.
  CPC ........ *B60N 2/66* (2013.01); *B60N 2002/0272* (2013.01)

(56) References Cited

U.S. PATENT DOCUMENTS

| | | | | |
|---|---|---|---|---|
| D307,221 S | * | 4/1990 | Mudge | 297/452.12 |
| 5,558,399 A | * | 9/1996 | Serber | B60N 2/4221 |
| | | | | 297/216.1 |
| D659,444 S | * | 5/2012 | James | D6/375 |
| 8,960,799 B2 | * | 2/2015 | Yoon | A47C 7/021 |
| | | | | 297/284.7 |
| 9,049,936 B2 | * | 6/2015 | Leone | A47C 3/12 |
| D808,187 S | * | 1/2018 | Ludwig | D6/375 |
| D821,793 S | * | 7/2018 | Ludwig | D6/716 |
| 2002/0060485 A1 | * | 5/2002 | Fischer | B60N 2/2222 |
| | | | | 297/284.4 |
| 2003/0122407 A1 | * | 7/2003 | Boyd | B60N 2/80 |
| | | | | 297/130 |
| 2008/0136237 A1 | * | 6/2008 | Kayumi | B60N 2/99 |
| | | | | 297/284.9 |
| 2011/0193386 A1 | * | 8/2011 | Gaither | B60N 2/242 |
| | | | | 297/316 |
| 2011/0285189 A1 | * | 11/2011 | Petzel | B60N 2/56 |
| | | | | 297/284.1 |
| 2015/0224899 A1 | * | 8/2015 | Menne, III | B60N 2/914 |
| | | | | 297/391 |
| 2017/0101042 A1 | * | 4/2017 | Zouzal | B60N 2/665 |
| 2018/0065518 A1 | * | 3/2018 | Boland | B60N 2/914 |
| 2018/0251048 A1 | * | 9/2018 | Line | B60N 2/646 |
| 2018/0339626 A1 | * | 11/2018 | Kojima | B60N 2/914 |

FOREIGN PATENT DOCUMENTS

| | | | | |
|---|---|---|---|---|
| DE | 102005022150 A1 | * | 9/2006 | B60N 2/986 |
| DE | 102006008234 A1 | * | 8/2007 | B60N 2/0284 |
| DE | 102009016050 A1 | * | 10/2010 | D04B 21/14 |
| DE | 102009016051 A1 | * | 10/2010 | A47C 3/12 |
| EP | 1110809 A2 | * | 6/2001 | A47C 7/40 |
| EP | 1526031 A2 | * | 4/2005 | B60N 2/002 |
| JP | H08-126548 A | | 5/1996 | |
| JP | 2009-137355 A | | 6/2009 | |
| WO | WO-0009358 A1 | * | 2/2000 | B60N 2/0284 |
| WO | WO-2008029182 A1 | * | 3/2008 | B60N 2/4249 |
| WO | WO-2015104676 A1 | * | 7/2015 | B60N 2/665 |
| WO | WO-2015178359 A1 | * | 11/2015 | B60N 2/64 |

* cited by examiner

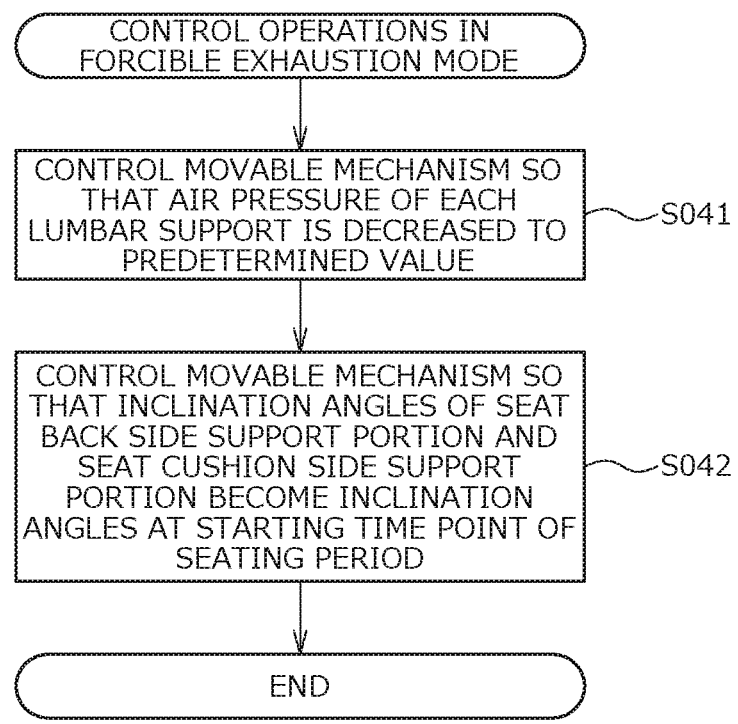

CONVEYANCE SEAT

CROSS REFERENCE TO RELATED APPLICATIONS

This application is based upon and claims the priority benefit of Japanese Patent Application Nos. JP 2017-146858, filed Jul. 28, 2017; JP 2017-043476, filed Mar. 8, 2017 and JP 2017-043475, filed Mar. 8, 2017, the contents being incorporated herein by reference.

BACKGROUND

The present disclosure relates to a conveyance seat, particularly, a conveyance seat that includes a pelvis support member for supporting a portion of an occupant's body where a pelvis is positioned.

Some conveyance seats such as vehicle seats provide a function of correcting a pelvis state of an occupant (e.g., a seated person). Examples of such conveyance seats include a vehicle seat described in JP 2009-137355 A. According to the vehicle seat described in JP 2009-137355 A, an inclination angle of a pelvis (hereinafter, referred to as a pelvis angle) of an occupant is estimated and an expansion/contraction member arranged inside a seat back and a seat cushion is expanded and contracted on the basis of the estimated result. This configuration makes it possible to adjust a support surface of the vehicle seat in accordance with the pelvis angle, thereby enabling correction of the posture (specifically, the pelvis angle) of the occupant.

In such a configuration, the conveyance seat may include a pelvis support member for supporting a portion where a pelvis is positioned in an occupant's body. This pelvis support member is formed as a sitting type and includes a portion arranged in a seat back (hereinafter, referred to as a seat back side support portion) and a portion arranged in a seat cushion (hereinafter, referred to as a seat cushion side support portion).

Further, in the conveyance seat including the above-mentioned pelvis support member, the pelvis support member is preferably made partially or wholly movable for the purpose of correcting the pelvis state of the occupant or the like. That is, there has been a demand for the conveyance seat in which a state, a position, and the like of the pelvis support member can be appropriately adjusted.

SUMMARY

The present disclosure has been made in view of the above-described problems, and an embodiment of the present disclosure provides a conveyance seat in which a state and the like of a pelvis support member can be adjusted.

According to the present disclosure, the above-described problems can be solved by an embodiment of a conveyance seat that includes a seating portion having a sear back and a seat cushion, a pelvis support member configured to support a portion of an occupant's body where a pelvis is positioned, the pelvis support member being arranged in the seating portion, and a movable mechanism configured to move the pelvis support member. The pelvis support member includes a seat back side support portion arranged in the seat back and positioned behind a back portion of an occupant, a seat cushion side support portion arranged in the seat cushion and positioned below buttocks of the occupant, and a connection portion that connects the seat back side support portion and the seat cushion side support portion. The movable mechanism is configured to move the pelvis support member so that a position of at least one of the seat back side support portion, the seat cushion side support portion, and the connection portion is changed with respect to the portion where the pelvis is positioned.

The conveyance seat of the present disclosure configured as described above includes the pelvis support member and the movable mechanism configured to move the pelvis support member. Further, the movable mechanism is configured to move the pelvis support member, thereby causing at least one of the seat back side support portion, the seat cushion side support portion, and the connection portion, all arranged in the pelvis support member, to move with respect to the portion where the pelvis is positioned in the occupant's body. In this manner, a state, a position, and the like of the pelvis support member can be adjusted.

Further, in the above configuration, it is preferable that the seat back side support portion includes a support surface that is positioned on the same side as the occupant seated on the conveyance seat and a sensor that detects an inclination angle of one of the seat back side support portion and the seat cushion side support portion with respect to the other and outputs a signal in accordance with the inclination angle, the sensor being installed in a central region of the support surface in a width direction of the conveyance seat. In the above configuration, the sensor is installed in the central region of the support surface of the seat back side support portion in the width direction of the conveyance seat. The central region of the support surface of the seat back side support portion is generally at a position opposed to a waist bent portion of the spinous process in the occupant's body. The sensor installed in such a position only slightly touches the back of the occupant. Thus, the occupant rarely feels a foreign-body sensation caused by the contact with the sensor.

Further, in the above configuration, it is preferable that the seat back side support portion includes a support surface that is positioned on the same side as the occupant seated on the conveyance seat, the support surface of the seat back side support portion has a recessed region that is formed on a portion of the support surface at a position recessed deeper than a peripheral region of the recessed region, and the seat back side support portion includes a sensor that detects an inclination angle of one of the seat back side support portion and the seat cushion side support portion with respect to the other and outputs a signal in accordance with the inclination angle, the sensor being installed in the recessed region. In the above configuration, the support surface of the seat back side support portion has the recessed region that is arranged at the position recessed deeper than the peripheral region (that is, a rear position). Further, the sensor is installed in the recessed region. That is, the sensor is installed in a region of the support surface further apart from the back of the occupant and thus hardly touches the back of the occupant. As a result, the occupant rarely feels a foreign-body sensation caused by the contact with the sensor.

Further, in the above configuration, it is preferable that the seat back side support portion is divided into a first seat back side support portion positioned on one end side in the width direction of the conveyance seat and a second seat back side support portion positioned on the other end side, the seat cushion side support portion is divided into a first seat cushion side support portion positioned on one end side in the width direction and a second seat cushion side support portion positioned on the other end side, and the movable mechanism is configured to individually move each of the first seat back side support portion and the second seat back side support portion and is also operable to individually move each of the first seat cushion side support portion and the second seat cushion side support portion. In the above configuration, each of the portion of one end side of the seat back side support portion (the first seat back side support portion) in the width direction of the conveyance seat and the portion of the other end side (the second seat back side support portion) can be individually moved. Similarly, in the above configuration, each of the portion of one end side of the seat cushion side support portion (the first seat cushion side support portion) in the width direction of the conveyance seat and the portion of the other end side (the second seat cushion side support portion) can be individually moved.

Further, in the above configuration, it is preferable that each of the seat back side support portion and the seat cushion side support portion has a support surface that is positioned on the same side as the occupant seated on the conveyance seat, the support surface of the seat back side support portion is curved forward towards ends of the support surface in the width direction of the conveyance seat, and the support surface of the seat cushion side support portion is curved upward towards ends of the support surface in the width direction. In the above configuration, each of the support surfaces of the seat back side support portion and the seat cushion side support portion is curved in a bow shape. Having such a configuration allows the pelvis support member to embrace the portion where the pelvis is positioned in the occupant's body. As a result, a function of the pelvis support member can be more appropriately achieved.

Further, in the above configuration, it is preferable that the movable mechanism is configured to move the pelvis support member so that at least one of the seat back side support portion and the seat cushion side support portion is rotated around an axis along the width direction of the conveyance seat with the connection portion as an origin and a length of the connection portion in the width direction of the conveyance seat is shorter than a length of the seat back side support portion in the width direction and is also shorter than a length of the seat cushion side support portion in the width direction. In the above configuration, the operation of the movable mechanism moves (deforms) the pelvis support member to change the inclination angle of the pelvis support member. In this configuration, the connection portion that connects the seat back side support portion and the seat cushion side support portion is formed narrower than the above two support portions. This configuration can facilitate the movement of the pelvis support member to change the inclination angle of the pelvis support member.

Further, in the above configuration, it is preferable that each of the seat back side support portion and the seat cushion side support portion has a support surface that is positioned on the same side as the occupant seated on the conveyance seat and the movable mechanism includes a first movable mechanism configured to move the pelvis support member so that at least one of the seat back side support portion and the seat cushion side support portion is rotated around the axis along the width direction of the conveyance seat with the connection portion as an origin and a second movable mechanism configured to move the pelvis support member so that end regions, in the width direction, of at least one of the support surfaces of the seat back side support portion and the seat cushion side support portion are moved inward in the width direction. In the above configuration, the second movable mechanism is provided in addition to the first movable mechanism. The second movable mechanism is configured so that the end regions, in the width direction of the conveyance seat, of at least one of the support surfaces of the seat back side support portion and the seat cushion side support portion are moved inward in the width direction. Such an operation allows the pelvis support member to move (deform) to embrace the occupant's body (in particular, the portion where the pelvis is positioned).

Further, in the above configuration, it is preferable that the seat back includes a pressure receiving member that is elastically deformable to be displaced backward by being pressed by the back of the occupant when a backward load acts on the occupant, the movable mechanism is fixed to the pressure receiving member, the seat back side support portion is attached to the movable mechanism, and the movable mechanism and the seat back side support portion are integrally moved backward along with the pressure receiving member when the backward load acts on the occupant. In the above configuration, the seat back side support portion is attached to the pressure receiving member via the movable mechanism. Then, the movable mechanism and the seat back side support portion are integrally moved backward along with the pressure receiving member when the backward load acts on the occupant. Such a configuration prevents the seat back side support portion and the movable mechanism from interfering with the backward displacement of the pressure receiving member.

According to an embodiment of the conveyance seat of the present disclosure, a state, a position, and the like of the pelvis support member can be adjusted. Further, according to an embodiment of the conveyance seat of the present disclosure, the sensor is installed in the central region of the support surface of the seat back side support portion in the width direction of the conveyance seat, thus the occupant rarely feels a foreign-body sensation caused by the contact with the sensor. Further, according to an embodiment of the conveyance seat of the present disclosure, the sensor is installed in the recessed region arranged in the support surface of the seat back side support portion, thus the occupant rarely feels a foreign-body sensation caused by the contact with the sensor. Further, according to an embodiment of the conveyance seat of the present disclosure, each of the first seat back side support portion positioned on one end side of the seat back side support portion in the width direction of the conveyance seat and the second seat back side support portion positioned on the other end side can be individually moved. Similarly, each of the first seat cushion side support portion positioned on one end side of the seat cushion side support portion in the width direction of the conveyance seat and the second seat cushion side support portion positioned on the other end side can be individually moved. Further, according to an embodiment of the conveyance seat of the present disclosure, the pelvis support member can support the portion where the pelvis is positioned in the occupant's body to embrace it. As a result, the pelvis support member can achieve the pelvis supporting function more appropriately. Further, according to an embodiment of the conveyance seat of the present disclosure, the pelvis support member can be easily moved to change the inclination angle of the pelvis support member. Further, according to an embodiment of the conveyance seat of the present disclosure, the second movable mechanism causes the end regions, in the width direction of the conveyance seat, of at least one of the support surfaces of the seat back side support portion and the seat cushion side support portion to move inward in the width direction. This configuration allows the pelvis support member to move (deform) to embrace the occupant's body (in particular, the portion where the pelvis is positioned). Further, according to an embodiment of the conveyance seat of the present disclosure, the seat back side support portion and the movable mechanism can be prevented from interfering with the backward displacement of the pressure receiving member when the backward load acts on the occupant.

BRIEF DESCRIPTION OF THE DRAWINGS

Various embodiments of the invention are illustrated in the drawings, in which:

FIG. 22 is a flowchart illustrating the ECU control in a forcible exhaustion mode.

DETAILED DESCRIPTION

First Embodiment

Hereinafter, a conveyance seat according to an embodiment (the present embodiment) of the present disclosure is described with reference to the drawings. Note that the embodiment described below is described to facilitate easy understanding of the present disclosure and is not to be interpreted as limiting the present disclosure. That is, the present disclosure may be modified or improved without departing from the gist of the present disclosure and such equivalents are also included in the present disclosure.

Further, below, a seat equipped in a vehicle (a vehicle seat) is used as an example to describe the conveyance seat according to the present embodiment. However, the present disclosure can be applied to the conveyance seats other than the vehicle seat, for example, seats equipped in a ship and an airplane.

Note that, in the following description, a "front to back direction" signifies a front to back direction of the vehicle seat and corresponds to an advancing direction of the traveling vehicle. Further, a "seat width direction" signifies a width direction of the vehicle seat and corresponds to a right and left direction viewed from an occupant seated on the vehicle seat. Further, an "up and down direction" signifies an up and down direction of the vehicle seat and corresponds to a vertical direction of the vehicle traveling on a horizontal surface.

Further, a shape, a position, and a posture of each portion of the seat described below are, unless particularly stated otherwise, conditions of the vehicle seat in a normal state (an initial state of the vehicle seat, where each portion of the seat is at an initial position).

Further, below, the occupant in a standard body proportion is exemplified to describe a positional relation between each portion of the vehicle seat and a body of the occupant. Note that the "standard body proportion" corresponds to a body proportion of a human body dummy made by modeling a male adult according to a Society of Automotive Engineers (SAE) standard.

Basic Configurations and Functions of Vehicle Seat According to Present Embodiment First, basic configurations and functions of the vehicle seat (hereinafter, referred to as a vehicle seat S) according to the present embodiment are described. The vehicle seat S is used as a driver seat, a passenger seat, or a back seat in the vehicle. Further, the vehicle seat S includes a seating portion Sh on which the occupant of the vehicle is seated. This seating portion Sh has a basic configuration in common with a seating portion of a conventional vehicle seat S.

Figure 1:
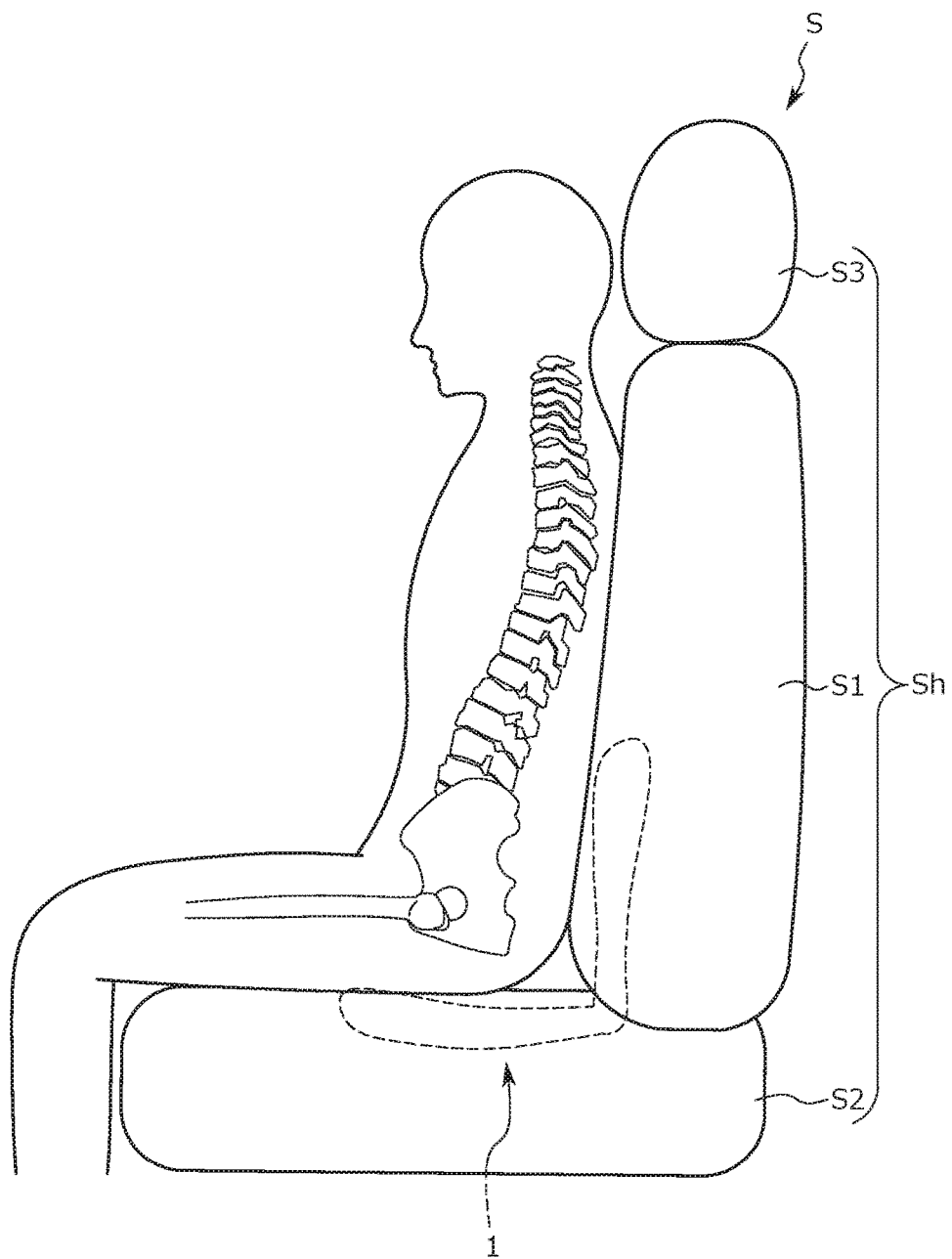
FIG. 1 is a side view illustrating a state in which an occupant is seated on a conveyance seat according to an embodiment of the present disclosure.

Specifically, as shown in FIG. 1, the seating portion Sh includes a seat back S1, a seat cushion S2, and a headrest S3. Each of the seat back S1 and the seat cushion S2 is configured such that a frame provided in its inside supports a pad P and a surface of the pad P is covered with an outer skin. Note that, the outer skins forming the seat back S1 and the seat cushion S2 are preferably highly stretchable considering a movement of a pelvis support member 1 described below.

Figure 3:
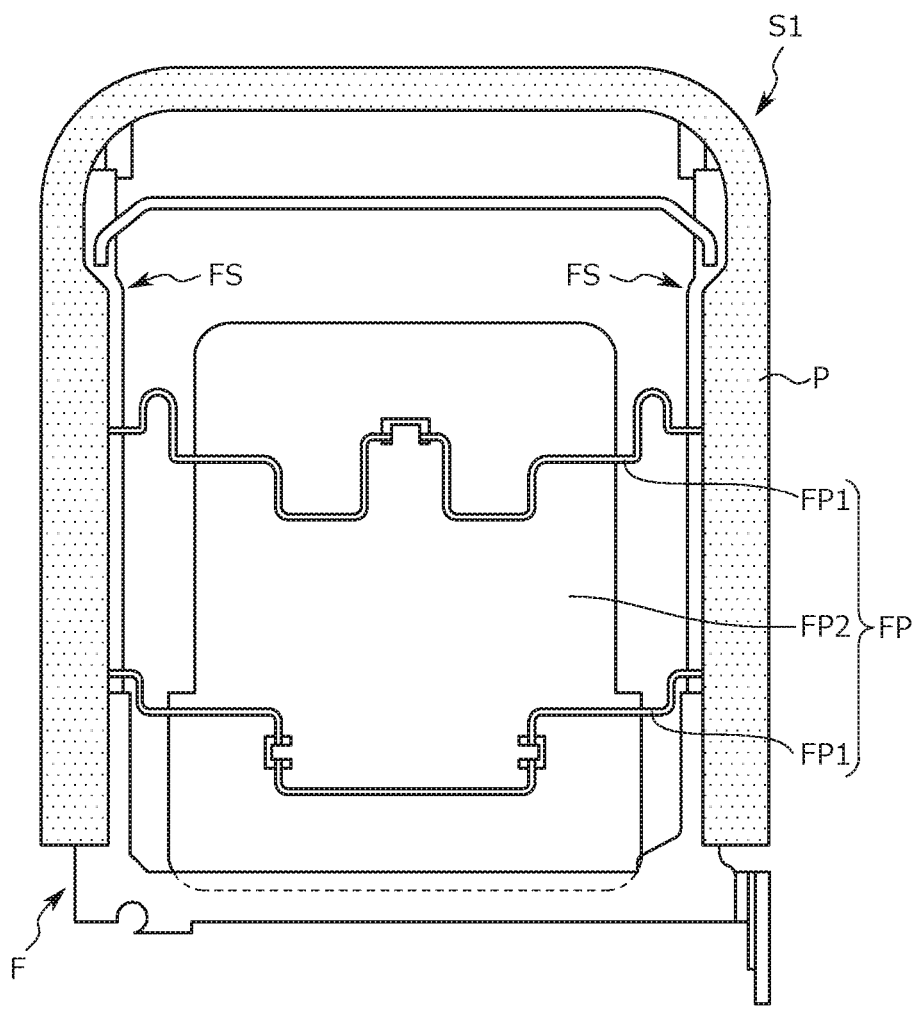
FIG. 3 is a back view of the seat back with the outer skin being removed.

Further, as shown in FIG. 3, a pressure receiving member FP is attached to the frame (a seat back frame F) of the seat back S1. This pressure receiving member FP is formed from an elastic spring FP1 and a resin plate FP2 supported by the elastic spring FP1. The elastic spring FP1 is bridged between side frames FS arranged on both ends of the seat back frame F. The resin plate FP2, which is arranged in a central portion of the seat back frame F in a seat width direction, is hooked on the elastic spring FP1 to be supported by the elastic spring FP1. Further, the resin plate FP2 has a width and height suitable for receiving a load acting backward (a backward load) from the back of the occupant seated on the vehicle seat S.

The pressure receiving member FP is elastically deformed to be displaced backward when the backward load acts on the pressure receiving member FP from the occupant, for example, during a vehicle rear end collision or the like. Specifically, the resin plate FP2 is pressed backward by the back of the occupant and the elastic spring FP1 supporting the resin plate FP2 is elastically deformed to be bent backward. In accordance with this deformation, the resin plate FP2 is also displaced backward.

Note that, in the present embodiment, the description is given to the pressure receiving member FP that is configured from the elastic spring FP1 and the resin plate FP2, however, the present disclosure is not limited thereto and the pressure receiving member FP may be formed only from the elastic spring FP1.

Figure 2:
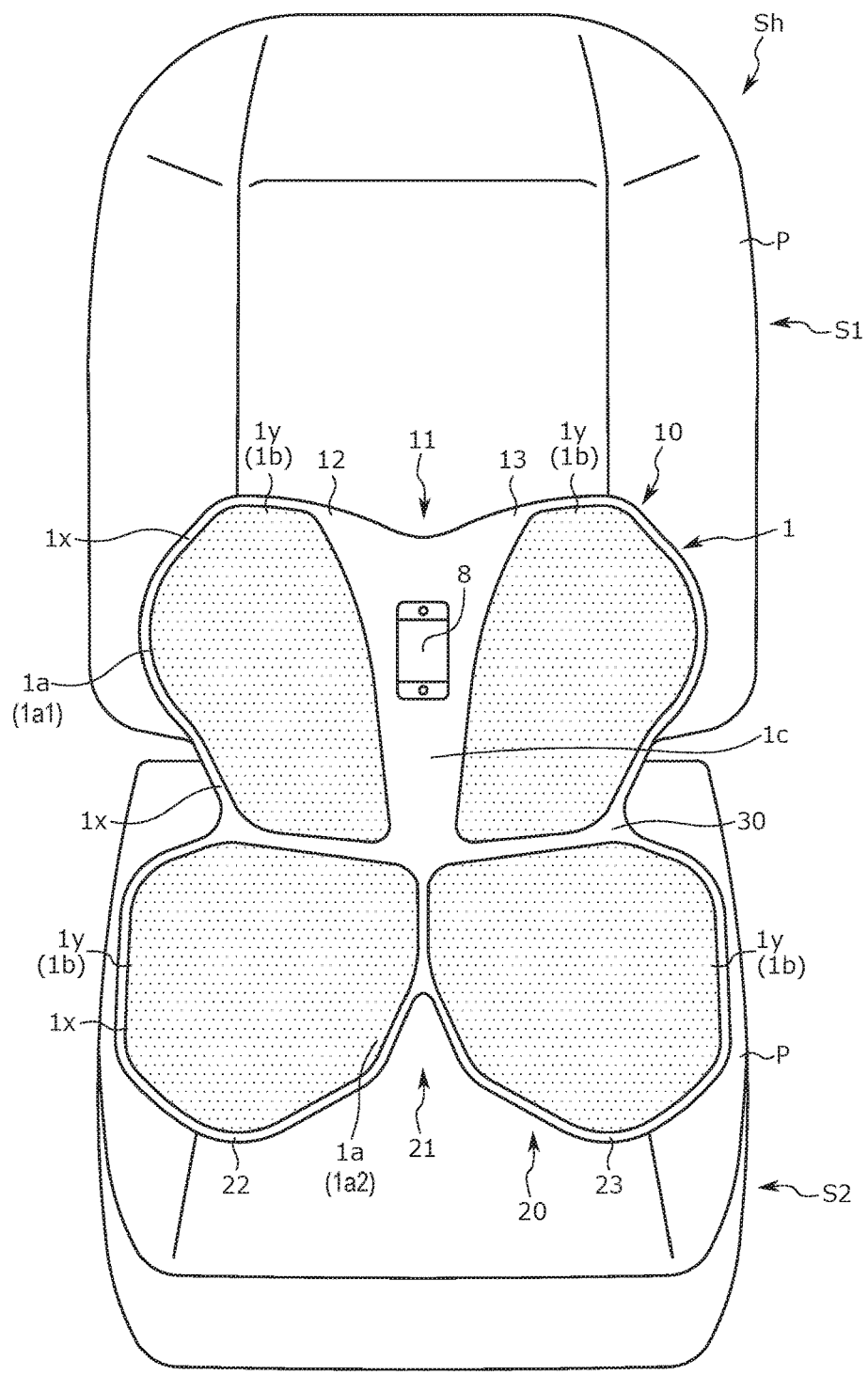
FIG. 2 is a front perspective view illustrating a seat back and a seat cushion with outer skins being removed.

Further, the vehicle seat S according to the present embodiment includes a pelvis support member 1 in the seating portion Sh. As shown in FIG. 2, this pelvis support member 1 is a member of a sitting type and arranged to extend from a lower portion of the seat back S1 to a rear portion of the seat cushion S2. That is, a portion of the pelvis support member 1 (specifically, a seat back side support portion 10 and a connection portion 30 described below) is arranged in the seat back S1 and the rest of the pelvis support member 1 (specifically, a seat cushion side support portion 20 described below) is arranged in the seat cushion S2.

Note that a hollowed-out space is provided for installing the pelvis support member 1 in the pad P forming each of the seat back S1 and the seat cushion S2 at a portion where the pelvis support member 1 is arranged. The pad P having the pelvis support member 1 arranged in such a space is covered with an outer skin forming each of the seat back S1 and the seat cushion S2 along with the pelvis support member 1.

Then, as shown in FIG. 1, the pelvis support member 1 of a sitting type supports a portion on an occupant's body where the pelvis is positioned (hereinafter referred to as a pelvis site) while the occupant is seated on the vehicle seat S (more specifically, the seating portion Sh). Further, each portion of the pelvis support member 1 is movable, thus a state (more specifically, a shape of the pelvis support member 1) and an arrangement position of the pelvis support member 1 can be changed by moving each portion of the pelvis support member 1.

Figure 4:
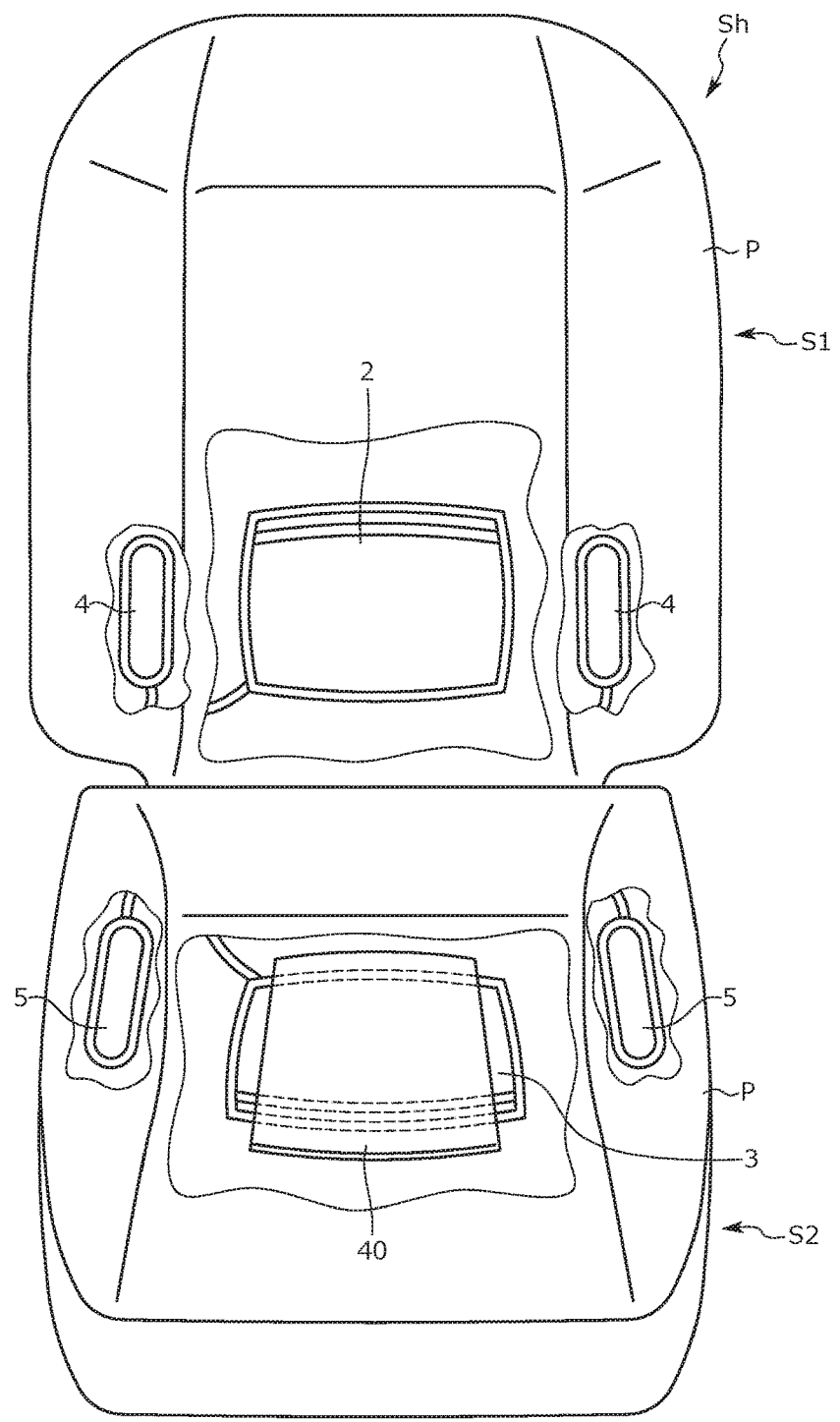
FIG. 4 is a front perspective view illustrating the seat back and the seat cushion with the outer skins and a pelvis support member being removed.

Specifically, in the seat back S1 and the seat cushion S2, lumbar supports 2, 3, 4, 5 are arranged on a back side (a side opposite to a side for supporting the occupant) of the pelvis support member 1 as shown in FIG. 4. These lumbar supports 2, 3, 4, 5 are movable mechanisms provided for moving the pelvis support member 1 and are formed from freely expandable air bags. Each of the lumbar supports 2, 3, 4, 5 presses the pelvis support member 1 from the back by expansion, and a pressed portion of the pelvis support member 1 moves along a pressing direction of each of the lumbar supports 2, 3, 4, 5. That is, the pressed portion of the pelvis support member 1 changes its position with respect to the pelvis site. Conversely, when each of the lumbar supports 2, 3, 4, 5 is contracted, the portion of the pelvis support member 1 that has been pressed by each of the lumbar supports 2, 3, 4, 5 is released from a pressing force and returned to an original position.

When the position of the portion of the pelvis support member 1 pressed by each of the lumbar supports 2, 3, 4, 5 is changed with respect to the pelvis site as described above, the state and arrangement position of the pelvis support member 1 change. When the state and arrangement position of the pelvis support member 1 change in this manner, a support state of the pelvis site (in other words, a constraint state of the pelvis site) by the pelvis support member 1 changes accordingly.

As described above, in the present embodiment, the support state of the pelvis site can be adjusted by moving the pelvis support member 1. That is, the vehicle seat S has a function of adjusting the support state of the pelvis site of the occupant as a seated person. Further, such a function of the vehicle seat S is utilized to correct the pelvis of the occupant (more specifically, the pelvis angle), correct a seating posture of the occupant, or train a muscle located in the pelvis site (more specifically, an inner muscle) by applying a load to the muscle.

Configurations of Pelvis Support Member

Next, configurations of the pelvis support member 1 are described in detail. The pelvis support member 1 is a sitting type and formed in a substantially L-like shape in a side view. The pelvis support member 1 includes the seat back side support portion 10, the seat cushion side support portion 20, and the connection portion 30 as shown in FIG. 5 and FIG. 6.

Figure 7:
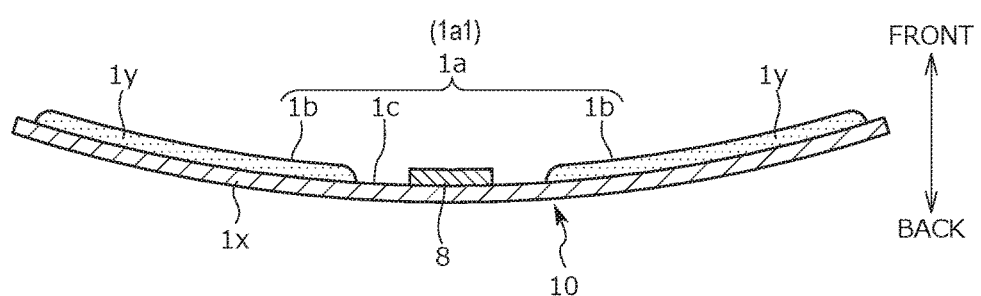
FIG. 7 is a cross-sectional view of a section A-A in FIG. 5.

The seat back side support portion 10 forms an upper end portion of the pelvis support member 1 and is arranged in the seat back S1 when the pelvis support member 1 is installed to the seating portion Sh. Further, the seat back side support portion 10 is positioned behind a back portion of the occupant when the occupant is seated on the vehicle seat S. With regard to a shape of the seat back side support portion 10, the seat back side support portion 10 is formed in a wide trapezoidal shape in an elevation view and has a right and left symmetrical shape having a border at a center of the pelvis support member 1 in the seat width direction as shown in FIG. 5. Further, the seat back side support portion 10 is curved in a bow shape to be positioned forward towards ends in the seat width direction as shown in FIG. 7.

Figure 5:
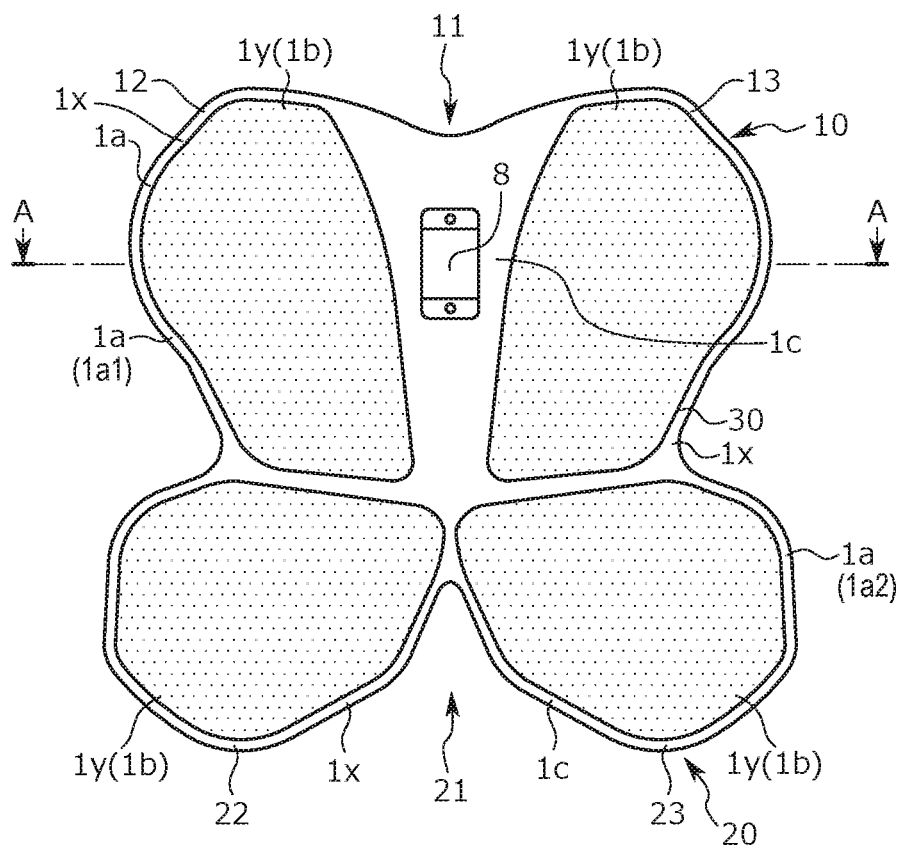
FIG. 5 is a front perspective view of the pelvis support member.
Figure 6:
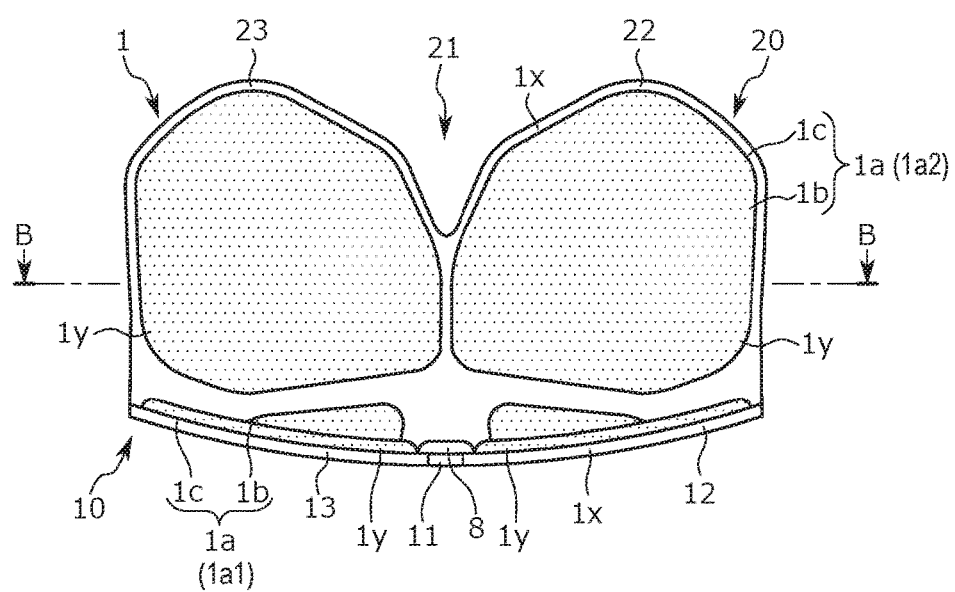
FIG. 6 is a top view of the pelvis support member.

Further, as shown in FIG. 5, a notch 11 in an inverted triangular shape extended downward from an upper end of the seat back side support portion 10 is formed in a central portion of the seat back side support portion 10 in the seat width direction. The seat back side support portion 10 is divided into a portion positioned on one end side in the seat width direction (in FIG. 5, a left half portion of the seat back side support portion 10, hereinafter referred to as a first seat back side support portion 12) and a portion positioned on the other end side in the seat width direction (in FIG. 5, a right half portion of the seat back side support portion 10, hereinafter referred to as a second seat back side support portion 13) by the notch 11 formed therebetween. The first seat back side support portion 12 and the second seat back side support portion 13 are separated from each other across the notch 11 and thus can move independently. That is, in the present embodiment, each of the first seat back side support portion 12 and the second seat back side support portion 13 can be moved individually.

The seat cushion side support portion 20 forms a lower end portion of the pelvis support member 1 and is arranged in the seat cushion S2 when the pelvis support member 1 is installed to the seating portion Sh. Further, the seat cushion side support portion 20 is positioned below buttocks of the occupant when the occupant is seated on the vehicle seat S. With regard to a shape of the seat cushion side support portion 20, the seat cushion side support portion 20 is slightly wider than the seat back side support portion 10 and has a right and left symmetrical shape having a border at the center of the pelvis support member 1 in the seat width direction as shown in FIG. 6.

Further, as shown in FIG. 6, a notch 21 in an inverted triangular shape extended backward from a front end of the seat cushion side support portion 20 is formed in a central portion of the seat cushion side support portion 20 in the seat width direction. The seat cushion side support portion 20 is divided into a portion positioned on one end side in the seat width direction (in FIG. 6, a right half portion of the seat cushion side support portion 20, hereinafter referred to as a first seat cushion side support portion 22) and a portion positioned on the other end side in the seat width direction (in FIG. 6, a left half portion of the seat cushion side support portion 20, hereinafter referred to as a second seat cushion side support portion 23) by the notch 21 formed therebetween. The first seat cushion side support portion 22 and the second seat cushion side support portion 23 are separated from each other across the notch 21 and thus can move independently. That is, in the present embodiment, each of the first seat cushion side support portion 22 and the second seat cushion side support portion 23 can be moved individually.

Figure 8:
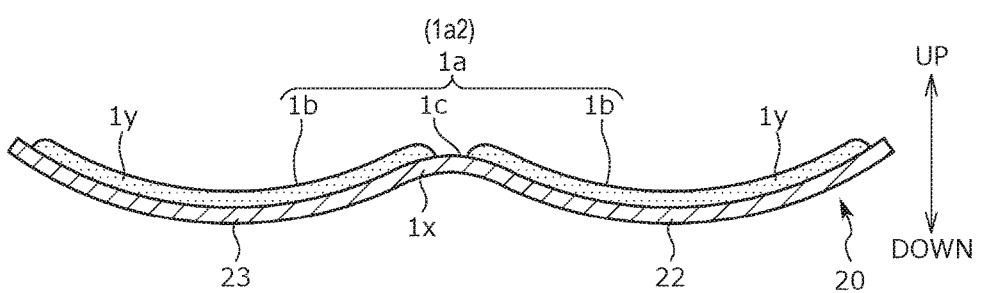
FIG. 8 is a cross-sectional view of a section B-B in FIG. 6.

Further, as shown in FIG. 8, each of the first seat cushion side support portion 22 and the second seat cushion side support portion 23 is curved in a bow-like shape to be positioned upward towards ends in the seat width direction.

The connection portion 30 is arranged directly under the seat back side support portion 10 and connects a lower end of the seat back side support portion 10 and a rear end of the seat cushion side support portion 20. Note that the connection portion 30 is arranged in the seat back S1 when the pelvis support member 1 is installed to the seating portion Sh. Further, the connection portion 30 is positioned behind the back portion of the occupant when the occupant is seated on the vehicle seat S.

With regard to a shape of the connection portion 30, the connection portion 30 is formed in an inverted isosceles trapezoid shape becoming narrower as advancing downward in an elevation view as shown in FIG. 5. Further, a width of the connection portion 30 (a length in the seat width direction) is shorter than a width of the seat back side support portion 10 and is also shorter than a width of the seat cushion side support portion 20. That is, the pelvis support member 1 is slightly narrowed inward in the seat width direction at the position of the connection portion 30.

Further, the connection portion 30 has a right and left symmetrical shape having a border at the center of the pelvis support member 1 in the seat width direction and is curved in a bow shape to be positioned forward as progressing to ends in the seat width direction.

Configurations of each portion of the pelvis support member 1 are now described in more detail. As shown in FIG. 5 to FIG. 8, each of the seat back side support portion 10, the seat cushion side support portion 20, and the connection portion 30 is formed from a base portion 1x made of a plate material and a cushion mat 1y stuck on a surface of the base portion 1x.

Further, the base portions 1x of the seat back side support portion 10, the seat cushion side support portion 20, and the connection portion 30 are integrally formed by a common plate material. Further, a material of the plate material forming the base portion 1x has moderate flexibility. Thus, when a load is applied to the pelvis support member 1, the pelvis support member 1 is bent (elastically deformed) such that a portion where the load is applied is moved along a load applying direction.

Thus, when the seat back side support portion 10 is pushed forward, the seat back side support portion 10 lies down toward the seat cushion side support portion 20, resulting in increasing an inclination angle of the pelvis support member 1. Similarly, when the seat cushion side support portion 20 is pushed upward, the seat cushion side support portion 20 rises toward the seat back side support portion 10, resulting in increasing the inclination angle of the pelvis support member 1. The term "inclination angle" described herein refers to an inclination angle of the seat back side support portion 10 with respect to the seat cushion side support portion 20, and the expression "the inclination angle being increased" means that the seat back side support portion 10 comes closer to the seat cushion side support portion 20.

Note that, when one of the seat back side support portion 10 and the seat cushion side support portion 20 moves toward the other to change the inclination angle of the pelvis support member 1, a lower end of the connection portion 30 serves as an origin. That is, each of the seat back side support portion 10 and the seat cushion side support portion 20 can rotate around an axis along the seat width direction with the lower end of the connection portion 30 as an origin.

The cushion mat 1y is stuck (e.g., attached) on a surface of the base portion 1x on the same side as the occupant seated on the vehicle seat S and molded into a shape of appropriately fitting to the pelvis site of the occupant. Note that, in the present embodiment, the cushion mat 1y is divided into a plurality of pieces and each piece is arranged at a mutually separated position as shown in FIG. 5 and FIG. 6.

Each of the seat back side support portion 10, the seat cushion side support portion 20, and the connection portion 30 includes a support surface 1a for supporting the occupant as shown in FIG. 7 (e.g., back side support surface 1a1) and FIG. 8 (e.g., cushion side support surface 1a2). This support surface 1a is a surface positioned on the same side as the occupant seated on the vehicle seat S, and specifically, a surface on which the cushion mat 1y is stuck. To explain more clearly, surfaces located on a more front side between both surfaces of the seat back side support portion 10 and the connection portion 30 correspond to the support surfaces 1a. A surface located on an upper side between both surfaces of the seat cushion side support portion 20 corresponds to the support surface 1a.

Further, each support surface 1a is curved to fit to the pelvis site of the occupant. Specifically, as shown in FIG. 7, the support surface 1a of the seat back side support portion 10 is curved in a bow-like shape to be positioned forward towards ends of the support surface 1a in the seat width direction. Similarly, the support surface 1a of the connection portion 30 is curved in a bow-like shape to be positioned forward towards ends of the support surface 1a in the seat width direction. Further, the support surface 1a of the seat cushion side support portion 20 is divided into a region positioned on one end side in the seat width direction (that is, the support surface 1a of the first seat cushion side support portion 22) and a region positioned on the other end side (that is, the support surface 1a of the second seat cushion side support portion 23). Then, each region is curved in a bow-like shape to be positioned upward towards ends in the seat width direction as shown in FIG. 8.

Further, each support surface 1a includes a protruding region 1b and a recessed region 1c as shown in FIG. 7 and FIG. 8. The protruding region 1b is a region of the support surface 1a that is raised higher than a peripheral region (specifically, the recessed region 1c) by a thickness of the cushion mat 1y by having the cushion mat 1y stuck on it. The recessed region 1c is formed on the support surface 1a in a portion where a surface of the base portion 1x is exposed (corresponding to a portion of the support surface 1a) and located at a position that is recessed deeper than a peripheral region (specifically, the protruding region 1b).

Note that a central region, in the seat width direction, of the support surface 1a of the seat back side support portion 10 forms the recessed region 1c as shown in FIG. 5 and FIG. 7.

Adjustment Devices of Pelvis Support Member

Figure 9:
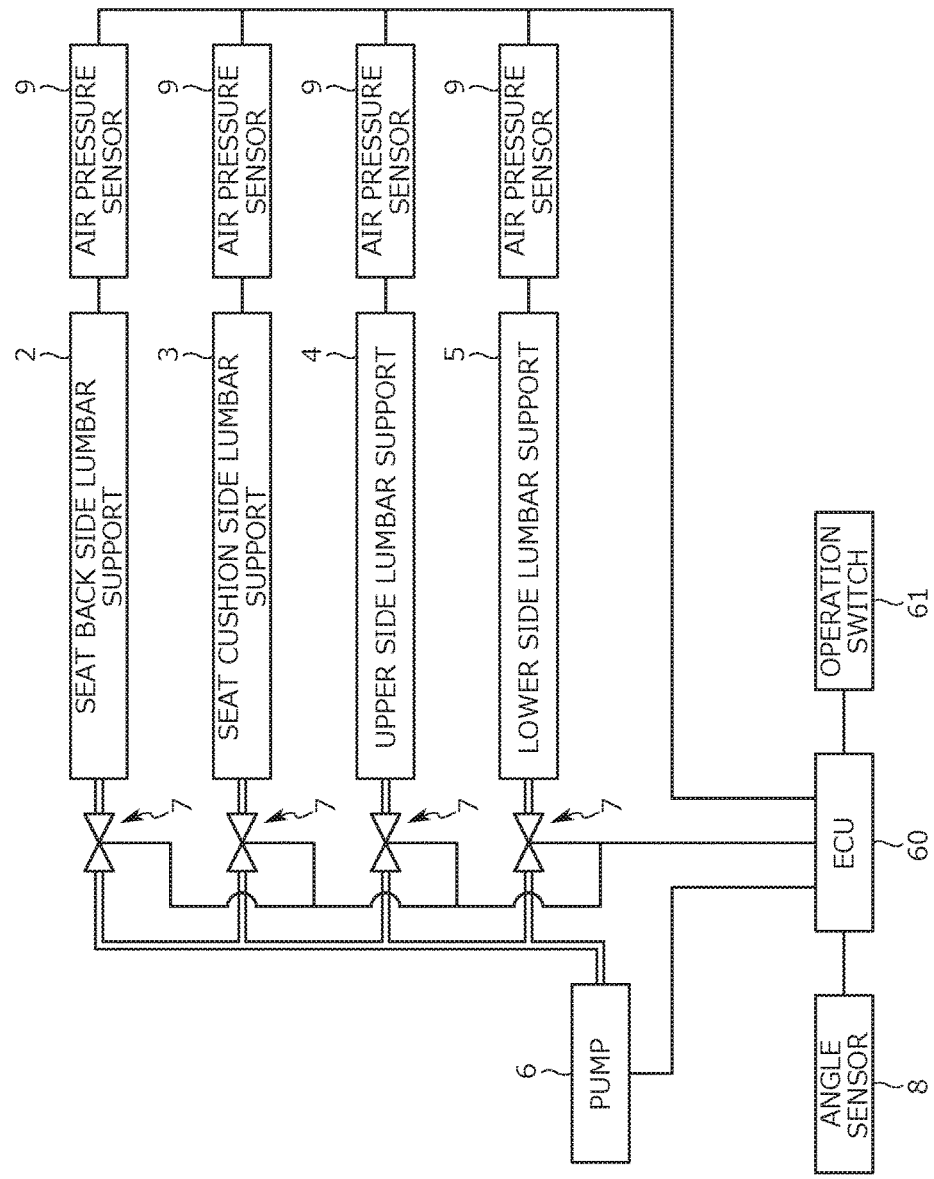
FIG. 9 is a schematic illustrating an adjustment device of the pelvis support member.

Next, a description is given of devices provided for adjusting the support state of the pelvis site by moving the pelvis support member 1. As shown in FIG. 9, the vehicle seat S has the lumbar supports 2, 3, 4, 5, a pump 6 serving as an air supply source, and one or more air adjusting valves 7 as devices for moving the pelvis support member 1. Further, as shown in FIG. 9, an ECU (Electronic Control Unit) 60 is installed in a vehicle as a controller for controlling the pump 6 and the air adjusting valve 7. Further, an angle sensor 8 and an air pressure sensor 9 are installed at specified locations in the vehicle seat S. Each device is described below.

The lumbar supports 2, 3, 4, 5, which are arranged on a back side of the pelvis support member 1, are expanded by air supplied from the pump 6 and filled therein to press the pelvis support member 1. In this manner, at least one of the seat back side support portion 10 and the seat cushion side support portion 20 is moved, resulting in a change in a position of that portion (the moved portion) with respect to the pelvis site.

In the present embodiment, four kinds of the lumbar supports 2, 3, 4, 5 are provided. With regard to each of the lumbar supports 2, 3, 4, 5, a first lumbar support (hereinafter referred to as a seat back side lumbar support 2) corresponds to a first movable mechanism and is arranged at a rear position of the seat back side support portion 10 in the seat back S1. This seat back side lumbar support 2 presses the seat back side support portion 10 from a back side to move the seat back side support portion 10 such that the seat back side support portion 10 rotates around the axis along the seat width direction with the connection portion 30 as an origin.

Figure 10A:
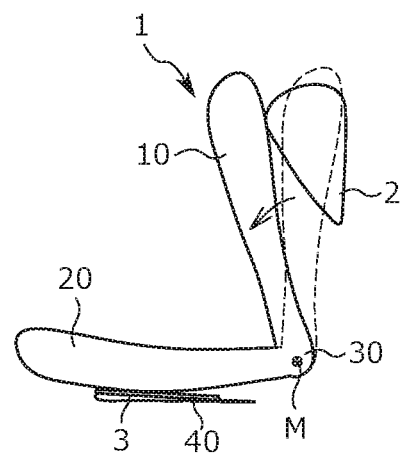
FIG. 10A is a diagram illustrating a state in which a seat back side support portion of the pelvis support member is inclined forward.

Specifically, as shown in FIG. 10A, the seat back side lumbar support 2 is developed in a substantially fan-like shape in a side view during expansion. The seat back side lumbar support 2 expands such that a developing quantity (an expansion quantity or inflation amount) increases towards an upper end. Further, an upper end portion of the seat back side lumbar support 2 is opposed to an upper end portion of a rear surface of the seat back side support portion 10. In this configuration, when the seat back side lumbar support 2 expands to be developed in a substantially fan-like shape, the upper end portion of the seat back side support portion 10 is pressed forward by the seat back side lumbar support 2. As a result, as shown in FIG. 10A, the seat back side support portion 10 is rotated forward (inclined forward) around the axis (represented by a symbol M in the figure) along the seat width direction with the connection portion 30 as an origin.

Figure 13:
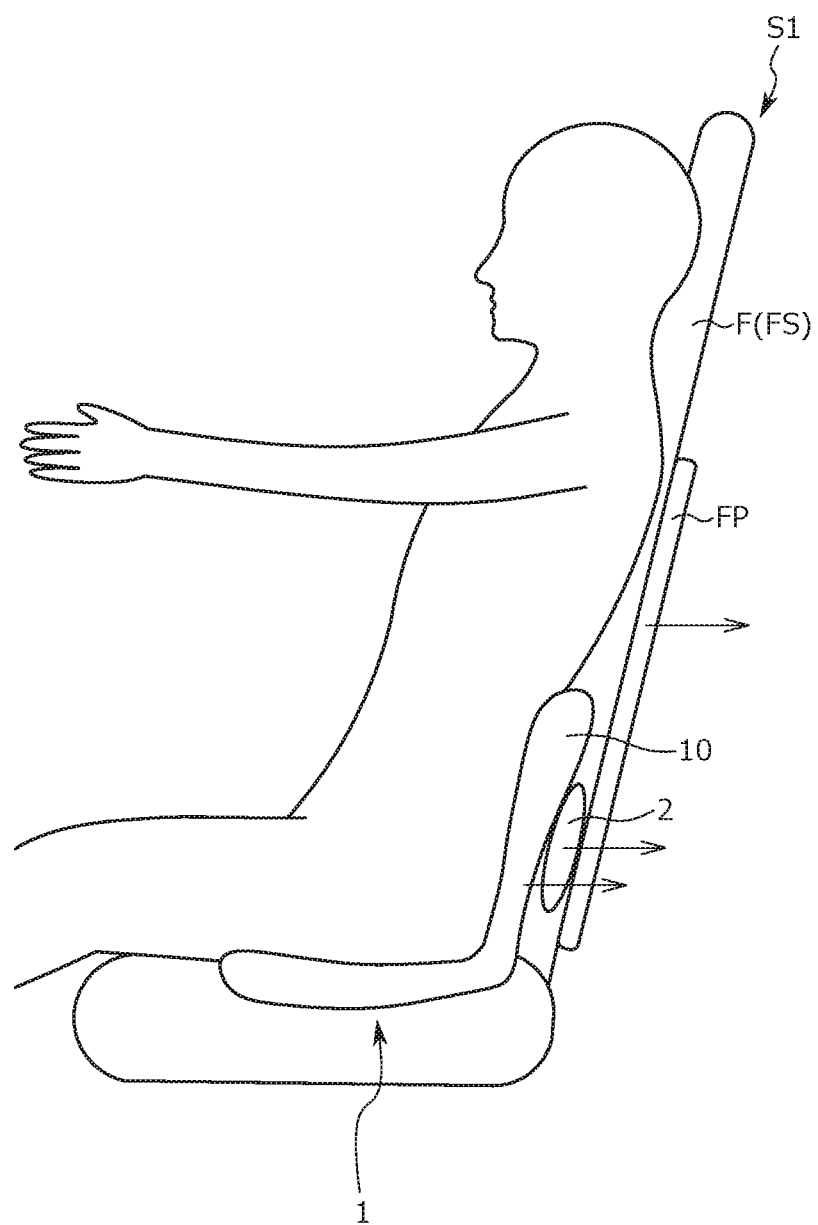
FIG. 13 is a schematic side view illustrating how a pressure receiving member and other components are displaced backward during a vehicle rear end collision.

Note that the seat back side lumbar support 2 is fixed to a front surface of the resin plate FP2 of the pressure receiving member FP described above with a screw or the like. Further, the upper portion of the rear surface of the seat back side support portion 10 is attached to the seat back side lumbar support 2. That is, the seat back side support portion 10 is fixed to the pressure receiving member FP via the seat back side lumbar support 2. In this configuration, when the backward load acts on the pressure receiving member FP from the occupant seated on the vehicle seat S by a vehicle rear end collision or the like and, consequently, the pressure receiving member FP is elastically deformed to be displaced backward, the seat back side lumbar support 2 and the seat back side support portion 10 are integrally moved backward along with the pressure receiving member FP as shown in FIG. 13.

A second lumbar support (hereinafter referred to as a seat cushion side lumbar support 3) corresponds to the first movable mechanism and is arranged at a lower position of the seat cushion side support portion 20 in the seat cushion S2. This seat cushion side lumbar support 3 presses the seat cushion side support portion 20 from a lower side to move the seat cushion side support portion 20 such that the seat cushion side support portion 20 rotates around the axis along the seat width direction with the connection portion 30 as an origin.

Figure 10B:
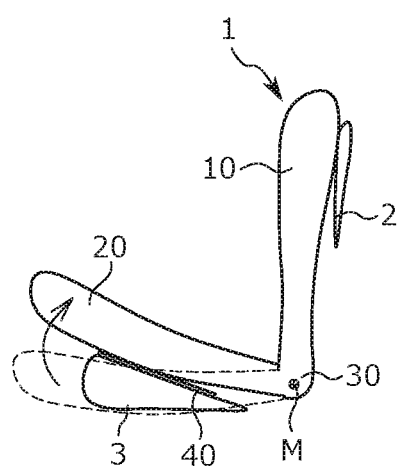
FIG. 10B is a diagram illustrating a state in which a seat cushion side support portion of the pelvis support member rises.

Specifically, as shown in FIG. 10B, the seat cushion side lumbar support 3 is developed in a substantially fan-like shape in a side view during expansion. The seat cushion side lumbar support 3 is expanded such that a developing quantity (an expansion quantity or inflation amount) increases towards a front end. Further, a front end portion of the seat cushion side lumbar support 3 is positioned directly under a front end portion of a lower surface of the seat cushion side support portion 20. In this configuration, when the seat cushion side lumbar support 3 expands to be developed in a substantially fan-like shape, the front end portion of the seat cushion side support portion 20 is pressed upward by the seat cushion side lumbar support 3. As a result, as shown in FIG. 10B, the seat cushion side support portion 20 is rotated upward (rises) around the axis (represented by the symbol M in the figure) along the seat width direction with the connection portion 30 as an origin.

Note that, as shown in FIG. 10A and FIG. 10B, a rectangular support plate 40 is provided below the seat cushion side support portion 20. The support plate 40 of relatively large size supports the seat cushion side support portion 20 over a relatively wide range. The seat cushion side lumbar support 3 is then arranged below the support plate 40. Thus, the seat cushion side support portion 20 is pressed by the seat cushion side lumbar support 3 via the support plate 40. In this configuration, the seat cushion side support portion 20 is pressed by the seat cushion side lumbar support 3 via the support plate 40, thus making it possible to efficiently move the seat cushion side support portion 20.

As described above, in the present embodiment, the inclination angle of the pelvis support member 1 can be adjusted by changing the expansion quantity of the seat back side lumbar support 2 or the seat cushion side lumbar support 3.

Figure 11A:
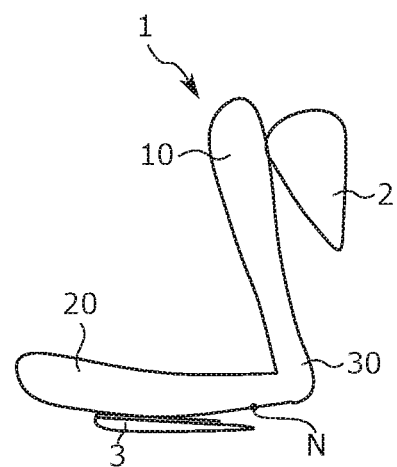
FIG. 11A is a diagram illustrating how an arrangement position of the pelvis support member changes, showing a state before changing.
Figure 11B:
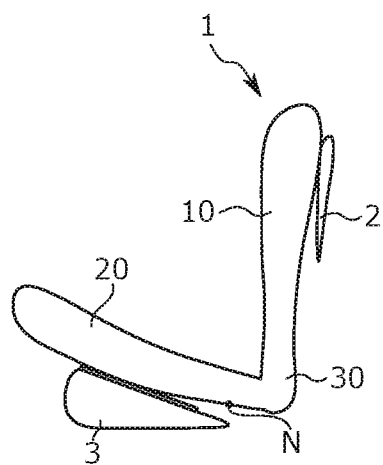
FIG. 11B is a diagram illustrating how the arrangement position of the pelvis support member changes, showing a state after changing.

Further, the expansion quantities of the seat back side lumbar support 2 and the seat cushion side lumbar support 3 can be simultaneously adjusted. For example, an adjustment can be made such that one of the lumbar supports is expanded by a specified expansion quantity and the other lumbar support is contracted by the same quantity. Expanding and contracting each of the lumbar supports in this manner enables movement of the entire pelvis support member 1 without changing the inclination angle as shown in FIG. 11A and FIG. 11B. Specifically, the entire pelvis support member 1 is rotated in a front to back direction and a up and down direction around a rotation fulcrum (represented by a symbol N in the figures) positioned below the seat cushion side support portion 20.

As described above, in the present embodiment, the arrangement position of the pelvis support member 1 in the vehicle seat S can be adjusted by simultaneously changing the expansion quantities of the seat back side lumbar support 2 and the seat cushion side lumbar support 3.

Third lumbar supports (hereinafter referred to as upper side lumbar supports 4) correspond to a second movable mechanism, and each of the third lumbar supports is arranged at a rear position of a side end portion (an end portion in the seat width direction) of the seat back side support portion 10 in the seat back S1. Further, in the present embodiment, the upper side lumbar supports 4 are arranged at right and left positions in a pair in a state of being separated from each other in the seat width direction. In this configuration, each of the upper side lumbar supports 4 presses the side end portion of the seat back side support portion 10 from behind, so that the seat back side support portion 10 is moved to increase a bending degree of the seat back side support portion 10 in a bow-like shape.

Figure 12A:
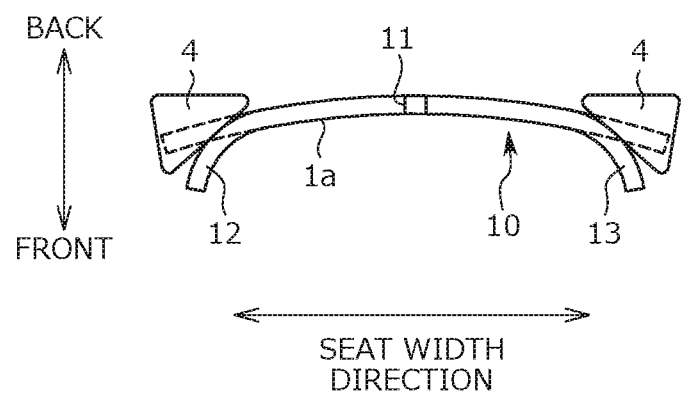
FIG. 12A is a diagram illustrating a state in which a bending degree of the seat back side support portion changes.

Specifically, as shown in FIG. 12A, the upper side lumbar supports 4 are developed in a substantially triangular shape in a top view during expansion. Each upper side lumbar support 4 expands such that a developing quantity (an expansion quantity) increases as progressing toward an outside in the seat width direction. Further, outside end portions of the upper side lumbar supports 4 in the seat width direction are opposed to the side end regions of the rear surface of the seat back side support portion 10. In this configuration, when the upper side lumbar supports 4 expand to be developed in a substantially triangular shape, the side end portions of the seat back side support portion 10 are pressed toward an inside in the seat width direction. As a result, as shown in FIG. 12A, the seat back side support portion 10 is bent further to increase the bending degree. In other words, end regions of the support surface 1a of the seat back side support portion 10 in the seat width direction are caused to move toward the inside in the seat width direction.

Note that, as described above, the seat back side support portion 10 is divided into the first seat back side support portion 12 and the second seat back side support portion 13 across the notch 11, so that each of the first seat back side support portion 12 and the second seat back side support portion 13 can be moved individually. Further, each of the first seat back side support portion 12 and the second seat back side support portion 13 has one upper side lumbar support 4. Thus, each of the first seat back side support portion 12 and the second seat back side support portion 13 can be operated to move individually by the operation of the corresponding upper side lumbar support 4. More specifically, the first seat back side support portion 12 or the second seat back side support portion 13, whichever is closer to the corresponding upper side lumbar support 4, is pressed at its side end portion from behind by the upper side lumbar support 4, so that the side end portion is moved toward the inside in the seat width direction.

Fourth lumbar supports (hereinafter referred to as lower side lumbar supports 5) correspond to the second movable mechanism, and each of the fourth lumbar supports is arranged at a lower position of a side end portion (an end portion in the seat width direction) of the seat cushion side support portion 20 in the seat cushion S2. Further, in the present embodiment, the lower side lumbar supports 5 are arranged at right and left positions in a pair in a state of being separated from each other in the seat width direction. In this configuration, each of the lower side lumbar supports 5 presses the side end portion of the seat cushion side support portion 20 from below, so that the seat cushion side support portion 20 is moved to increase the bending degree of the seat cushion side support portion 20 in a bow-like shape.

Figure 12B:
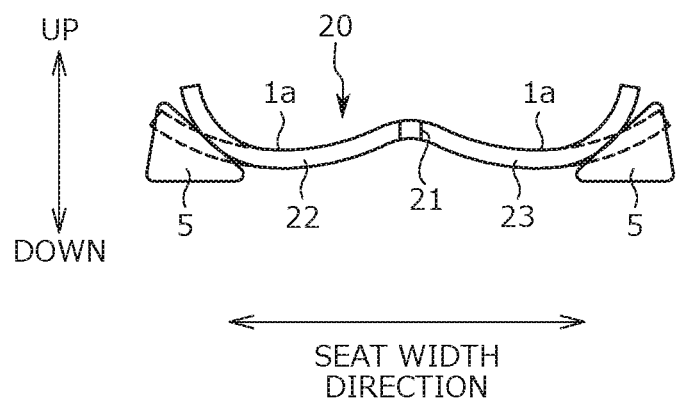
FIG. 12B is a diagram illustrating a state in which a bending degree of the seat cushion side support portion changes.

Specifically, as shown in FIG. 12B, the lower side lumbar supports 5 are developed in a substantially triangular shape in an elevation view during expansion. Each lower side lumbar supports 5 expands such that a developing quantity (an expansion quantity) increases towards the outside in the seat width direction. Further, outside end portions of the lower side lumbar supports 5 in the seat width direction are opposed to side end regions of a lower surface of the seat cushion side support portion 20. In this configuration, when the lower side lumbar supports 5 expand to be developed in a substantially triangular shape, the side end portions of the seat cushion side support portion 20 are pressed toward the inside in the seat width direction. As a result, as shown in FIG. 12B, the seat cushion side support portion 20 is bent further to increase the bending degree. In other words, end regions of the support surface 1a of the seat cushion side support portion 20 in the seat width direction are caused to move toward the inside in the seat width direction.

Note that, as described above, the seat cushion side support portion 20 is divided into the first seat cushion side support portion 22 and the second seat cushion side support portion 23 across the notch 21, so that each of the first seat cushion side support portion 22 and the second seat cushion side support portion 23 can be moved individually. Further, each of the first seat cushion side support portion 22 and the second seat cushion side support portion 23 has one lower side lumbar support 5. Thus, each of the first seat cushion side support portion 22 and the second seat cushion side support portion 23 can be operated to move individually by the operation of the corresponding lower side lumbar support 5. More specifically, the first seat cushion side support portion 22 or the second seat cushion side support portion 23, whichever is closer to the corresponding lower side lumbar support 5, is pressed at its side end portion from below by the lower side lumbar support 5, so that the side end portion is moved toward the inside in the seat width direction.

The adjustment devices of the pelvis support member 1 other than the lumbar supports are now described. The pump 6 and the air adjusting valve 7 are devices operated for adjustment of the expansion quantities of the lumbar supports. The pump 6, which is formed from a pump configured to suck and supply air, supplies air to the lumbar supports 2, 3, 4, 5 and sucks air in the lumbar supports 2, 3, 4, 5. The air adjusting valve 7 is opened and closed for adjusting an air pressure in each of the lumbar supports 2, 3, 4, 5 and provided in each lumbar support. In this configuration, each of the lumbar supports 2, 3, 4, 5 can be individually adjusted. Note that each of the lumbar supports 2, 3, 4, 5 is filled with some air in its inside and thus moderately expanded in a normal state.

Further, the pump 6 and the air adjusting valve 7 may be arranged inside the vehicle seat S (e.g., inside the seat back S1) or outside the vehicle seat S (e.g., a device housing space provided in a vehicle body).

Further, the on-off status of the pump 6 and the opening of the air adjusting valve 7 are controlled by the ECU 60. More specifically, when an operation switch 61 shown in FIG. 9 is operated by the occupant, the ECU 60 controls the pump 6 and the air adjusting valve 7 by using the switching operation as a trigger. Then, the control performed by the ECU 60 causes a change in the expansion quantity of each lumbar support in accordance with an operation position of the operation switch 61. Further, as a consequence of the expansion quantity change, the inclination angle and the position (the arrangement position) of the pelvis support member 1 or the bending degrees of the seat back side support portion 10 and the seat cushion side support portion 20 are adjusted.

Further, when the ECU 60 adjusts the pump 6 and the air adjusting valve 7, measurements are made by the angle sensor 8 and the air pressure sensor 9. The angle sensor 8 is a sensor that detects the inclination angle, that is, an inclination angle, of one of the seat back side support portion 10 and the seat cushion side support portion 20 with respect to the other, and outputs a signal in accordance with the inclination angle. This angle sensor 8 uses a non-contact type known sensor configured to detect the inclination angle.

The air pressure sensor 9 detects the air pressure in each of the lumbar supports 2, 3, 4, 5 and outputs a signal in accordance with the air pressure. This air pressure sensor 9 uses a known sensor configured to detect the air pressures in the lumbar supports and is provided in each lumbar support. Note that the air pressure detected by the air pressure sensor 9 changes in accordance with the expansion quantity of the lumbar support and a seating pressure applied when the occupant is seated on the vehicle seat S.

The output signals from the angle sensor 8 and the air pressure sensor 9 are transmitted to the ECU 60. Then, the ECU 60 analyzes the received signals and controls the pump 6 and the air adjusting valve 7 in accordance with the analysis result and the operation position of the operation switch 61.

In the present embodiment, the angle sensor 8 is installed in a specified position in the pelvis support member 1. More specifically, each of the seat back side support portion 10 and the seat cushion side support portion 20 has one angle sensor 8.

Specifically, the seat back side support portion 10 includes the angle sensor 8 that senses the inclination angle of the seat back side support portion 10 with respect to the seat cushion side support portion 20. With regard to an installation location of this angle sensor 8, as shown in FIG. 5 and other figures, the angle sensor 8 provided in the seat back side support portion 10 is installed to the support surface 1a of the seat back side support portion 10, specifically, a central region of the support surface 1a in the seat width direction. The central region of the support surface 1a described herein is located at a position opposed to a waist bent portion of the spinous process (a part of the back portion slightly curved forward) in the body of the occupant seated on the vehicle seat S. The angle sensor 8 installed in such a position only slightly touches the back of the occupant, thus the occupant rarely feels a foreign-body sensation caused by the contact with the angle sensor 8.

The central region of the support surface 1a of the seat back side support portion 10 is now further described. As shown in FIG. 5 and FIG. 7, most of the central region including the portion where the angle sensor 8 is installed forms the recessed region 1c. That is, the angle sensor 8 is installed in a region of the support surface 1a of the seat back side support portion 10, which is more rearwardly recessed. The angle sensor 8 in such a location only slightly touches the back of the occupant and, as a result, the occupant further rarely feels a foreign-body sensation caused by the contact with the angle sensor 8.

On the other hand, the seat cushion side support portion 20 includes the angle sensor 8 that senses the inclination angle of the seat cushion side support portion 20 with respect to the seat back side support portion 10. This angle sensor 8 is installed to a central portion of the seat cushion side support portion 20 in the seat width direction (e.g., a central region of a backside surface of the seat cushion side support portion 20 in the seat width direction).

Modifications in Adjusting Inclination Angle of Pelvis Support Member

In the embodiment describe above, 2 lumbar supports (specifically, the seat back side lumbar support 2 and the seat cushion side lumbar support 3) are used as a mechanism for adjusting the inclination angle of the pelvis support member 1. More specifically, in the above embodiment, each of the seat back side support portion 10 and the seat cushion side support portion 20 has one lumbar support (more specifically, the lumbar support for changing the inclination angle). That is, in the above embodiment, when the seat back side support portion 10 is pressed by the seat back side lumbar support 2, the entire seat back side support portion 10 moves forward as a whole. Similarly, when the seat cushion side support portion 20 is pressed by the seat cushion side lumbar support 3, the entire seat cushion side support portion 20 moves upward as a whole.

Each of the seat back side support portion 10 and the seat cushion side support portion 20 is divided into two portions arranged side by side across the notches 11 and 21, respectively, and each portion is configured to be individually movable. Regarding this point, as a modification of the present embodiment, there may be a case where each of the first seat back side support portion 12 and the second seat back side support portion 13 includes one seat back side lumbar support 2 at a rear position thereof (hereinafter referred to as a first modification). Similarly, there may be a case where each of the first seat cushion side support portion 22 and the second seat cushion side support portion 23 includes one seat cushion side lumbar support 3 at a lower position thereof (hereinafter referred to as a second modification).

Figure 14:
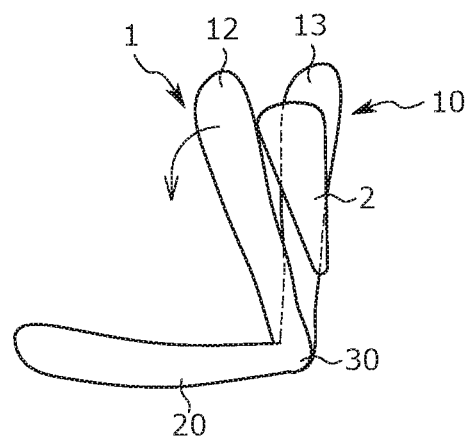
FIG. 14 is a diagram illustrating a first modification in adjusting the inclination angle of the pelvis support member.

In the first modification, each of the first seat back side support portion 12 and the second seat back side support portion 13 includes one seat back side lumbar support 2. Thus, each of the seat back side lumbar supports 2 can be individually moved. As a result, as shown in FIG. 14, it becomes possible to independently move the first seat back side support portion 12 and the second seat back side support portion 13, more specifically, it becomes possible to independently rotate them around the axis along the seat width direction with the connection portion 30 as an origin.

Figure 15:
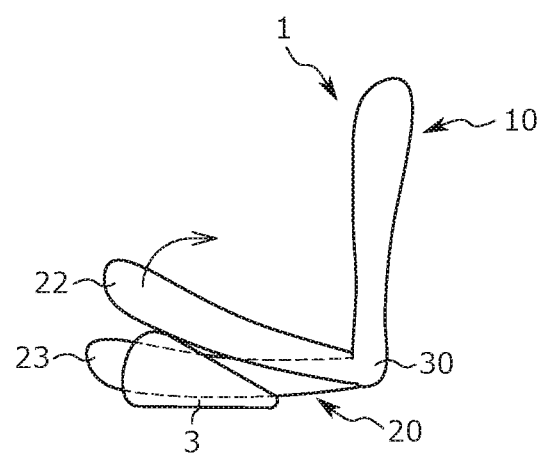
FIG. 15 is a diagram illustrating a second modification in adjusting the inclination angle of the pelvis support member.

In the second modification, each of the first seat cushion side support portion 22 and the second seat cushion side support portion 23 includes one seat cushion side lumbar support 3. Thus, each of the seat cushion side lumbar supports 3 can be individually moved. As a result, as shown in FIG. 15, it becomes possible to independently move the first seat cushion side support portion 22 and the second seat cushion side support portion 23, more specifically, it becomes possible to independently rotate them around the axis along the seat width direction with the connection portion 30 as an origin.

Other Embodiments

Hitherto, as an embodiment of the present disclosure, the configurations of the vehicle seat S in which the pelvis support member 1 is installed have been described. However, the embodiment of the present disclosure is not limited to the above configurations and other configurations may be also used.

Specifically, in the above embodiment, the lumbar support (an air bag) that is freely expandable by the inflow and outflow of air is used as the movable mechanism. However, the present disclosure is not limited thereto and other movable mechanisms (specifically, a mechanism in which each portion of the pelvis support member 1 is moved by the traction of a wire or a mechanism in which each portion of the pelvis support member 1 is moved using a retractably movable rod) may be used.

Further, in the above embodiment, the seat back side support portion 10 and the seat cushion side support portion 20 are directly pressed to move the pelvis support member 1. However, the present disclosure is not limited thereto and the seat back side support portion 10 and the seat cushion side support portion 20 may be indirectly moved by moving the connection portion 30 in the pelvis support member 1.

Further, in the above embodiment, the seat back side support portion 10 and the seat cushion side support portion 20 are rotated around the axis along the seat width direction to move the pelvis support member 1. However, the directions in which the seat back side support portion 10 and the seat cushion side support portion 20 are moved are not particularly limited, and the seat back side support portion 10 and the seat cushion side support portion 20 may be moved linearly in a front to back direction or a up and down direction.

Second Embodiment

Hereinafter, configuration examples and operation examples of an embodiment (the present embodiment) of the present disclosure are described. Below, the embodiment is described by exemplarily presenting a case where a seating device adjustment unit of the present disclosure is installed in a vehicle. That is, in the embodiment described below, the seating device is represented by a vehicle seat and the seating device adjustment unit is provided for the purpose of adjusting the vehicle seat.

Note that the seating device adjustment unit of the present disclosure is not limited to a case where the seating device adjustment unit is installed in a vehicle, and it may be installed in a conveyance other than the vehicle (e.g., an airplane and a ship) and used to adjust a seat arranged in the conveyance.

Further, in the following description, a "front to back direction" signifies a front to back direction viewed from an occupant seated on the vehicle seat and corresponds to an advancing direction of the vehicle. Further, a "seat width direction" corresponds to a width direction of the seating device and signifies a right and left direction viewed from the occupant seated on the vehicle seat. Further, an "up and down direction" signifies an up and down direction viewed from the occupant seated on the vehicle seat and corresponds to a vertical direction of the vehicle traveling on a horizontal surface.

Outline of Seating Device Adjustment Unit According to Present Embodiment

First, an outline of the seating device adjustment unit according to the present embodiment (hereinafter, simply referred to as a seating device adjustment unit 100) is described. The seating device adjustment unit 100 is installed in the vehicle and used for the purpose of correcting a posture of the occupant in a period of time during which the occupant of the vehicle is seated on the vehicle seat S (hereinafter referred to as a seating period). More specifically, the seating device adjustment unit 100 changes a state of a portion of the vehicle seat S (specifically, a pelvis support member 1 described below) during the seating period, thereby displacing a portion in an occupant's body where the pelvis is positioned (hereinafter referred to as a pelvis site). Displacing the pelvis site in this manner can correct a seating posture of the occupant, more specifically, adjust a pelvis angle (an inclination angle of the pelvis in a front to back direction) of the occupant.

With regard to an adjustment function of the seating device adjustment unit 100, in the present embodiment, adjustments can be made in three different ways. A first adjustment adjusts a seat state to correct the pelvis angle of the occupant to an angle suitable for the occupant. A second adjustment adjusts the seat state to correct the pelvis angle of the occupant to an "ideal" angle. A third adjustment adjusts the seat state to swing the pelvis site for the purpose of training a muscle located in the pelvis site of the occupant.

The occupant selects one among the three kinds of the adjustments described above and receives the adjustment of selected content during the seating period. Note that, in the present embodiment, the seating device adjustment unit 100 is used to adjust the state of the seat corresponding to a driver seat among the vehicle seats S. However, the present disclosure is not limited thereto and the seating device adjustment unit 100 may be used for the purpose of adjusting the state of the vehicle seats S other than the driver seat (e.g., a passenger seat or a back seat).

Configuration Examples of Seating Device Adjustment Unit

Figure 16:
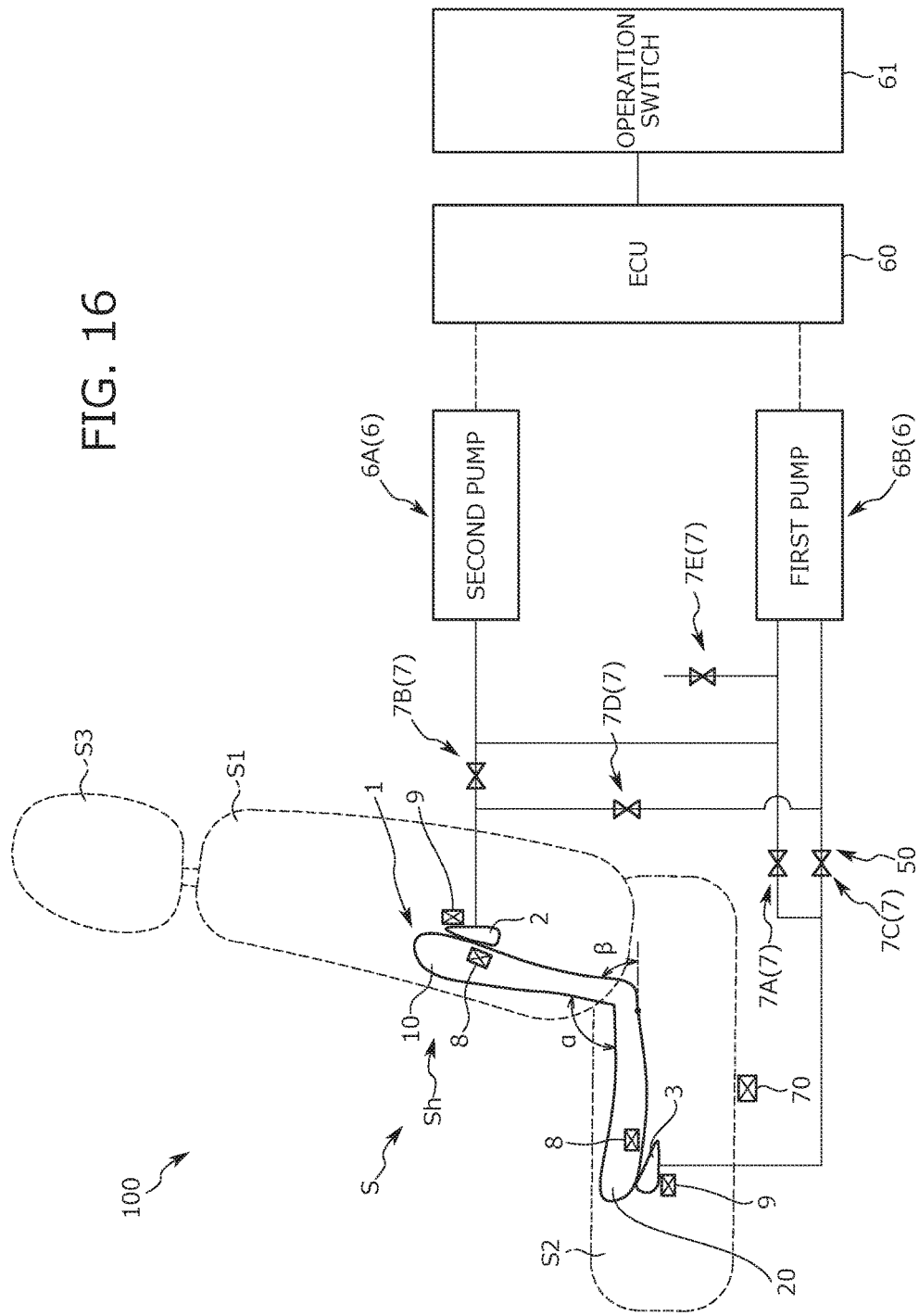
FIG. 16 is a schematic diagram illustrating a seating device adjustment unit according to an embodiment of the present disclosure.

Next, configuration examples of the seating device adjustment unit 100 are described with reference to FIG. 1 and FIG. 16. As shown in FIG. 1, the seating device adjustment unit 100 includes the vehicle seat S as the seating device and the pelvis support member 1 installed in the vehicle seat S. Further, as shown in FIG. 16, the seating device adjustment unit 100 includes a movable mechanism 50 configured to move the pelvis support member 1. Further, the seating device adjustment unit 100 includes a kneading unit 80 for effectively performing the second adjustment described above. Further, the seating device adjustment unit 100 includes the ECU (Electronic Control Unit) 60, which is a device configured to control the movable mechanism 50, and various sensors that transmit signals to the ECU 60. Below, each component device of the seating device adjustment unit 100 is described.

Vehicle Seat

The vehicle seat S has a similar structure as a common vehicle seat S but also includes the pelvis support member 1 in its inside. That is, as shown in FIG. 1, the vehicle seat S includes the seat back S1, the seat cushion S2, and the headrest S3. The seat back S1, the seat cushion S2, and the headrest S3 form the seating portion Sh, which is a main portion of the vehicle seat S. Each of the seat back S1 and the seat cushion S2 has the frame in its inside and is formed by supporting the pad P by the frame and covering the surface of the pad P with the outer skin. Note that the outer skins forming the seat back S1 and the seat cushion S2 are preferably highly stretchable considering the movement of the pelvis support member 1.

Pelvis Support Member

The pelvis support member 1 is a resin molded article molded as a sitting type. The pelvis support member 1 is arranged in the vehicle seat S, specifically the pelvis support member 1 is arranged to extend from the lower portion of the seat back S1 to the rear portion of the seat cushion S2. That is, a portion of the pelvis support member 1 is arranged in the seat back S1 and the rest of the pelvis support member 1 is arranged in the seat cushion S2 as shown in FIG. 1.

Figure 17:
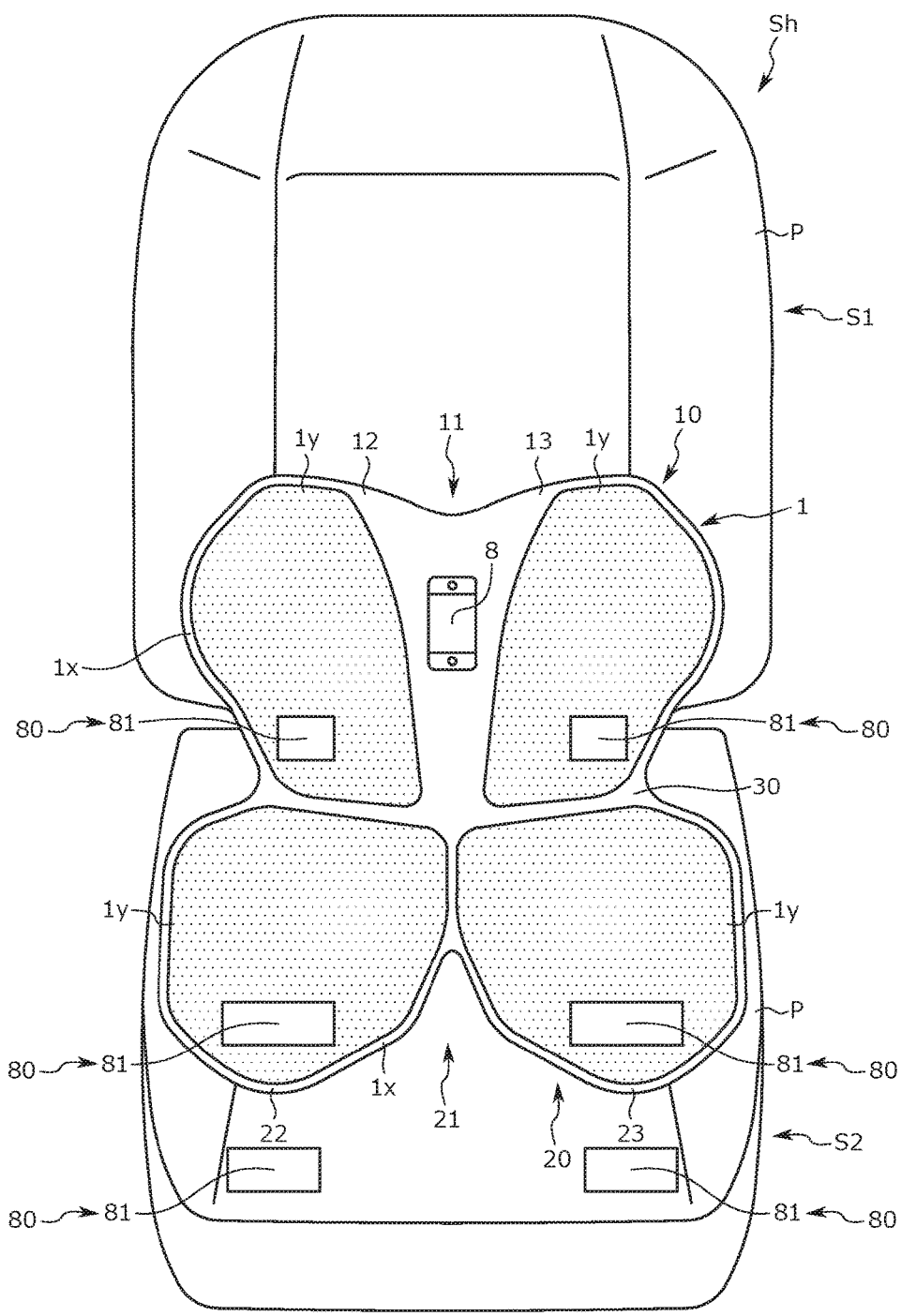
FIG. 17 is a front perspective view illustrating the seat back and the seat cushion with the outer skins being removed.

Note that, as is evident from FIG. 17 and FIG. 4, a hollowed-out space is provided for installing the pelvis support member 1 in the pad P forming the seat back S1 and the seat cushion S2 at a portion where the pelvis support member 1 is arranged. The pad P having the pelvis support member 1 arranged in such a space is covered with the outer skin forming the seat back S1 and the seat cushion S2 along with the pelvis support member 1.

Then, as shown in FIG. 1, the pelvis support member 1 of a sitting type supports the pelvis site of the occupant's body during the seating period. Further, each portion of the pelvis support member 1 is movable. Thus, the shape and the arrangement position of the pelvis support member 1 change as each portion of the pelvis support member 1 is moved. More specifically, the inclination angle of the pelvis support member 1 (an angle represented by a symbol α in FIG. 16) and a displacement amount of the pelvis support member 1 from an initial position (a displacement amount of an angle represented by a symbol β in FIG. 16) change. The seat state (in particular, the state of the seat around the pelvis site of the occupant) can be adjusted by changing the shape and the arrangement position of the pelvis support member 1 in a manner described above.

Below, a detailed structure of the pelvis support member 1 is described with reference to FIG. 17 and FIG. 4 to FIG. 8. The pelvis support member 1 of a sitting type is formed in a substantially L-like shape in a side view. Further, the pelvis support member 1 includes the seat back side support portion 10, the seat cushion side support portion 20, and the connection portion 30 as shown in FIG. 5 and FIG. 6.

The seat back side support portion 10 forms the upper end portion of the pelvis support member 1 and is arranged in the seat back S1 when the pelvis support member 1 is installed to the seating portion Sh of the vehicle seat S. That is, the seat back side support portion 10 is positioned behind the back portion of the occupant during the seating period. With regard to the shape of the seat back side support portion 10, as shown in FIG. 5, the seat back side support portion 10 is formed in a wide trapezoidal shape in an elevation view and has a right and left symmetrical shape having a border at the center of the pelvis support member 1 in the seat width direction. Further, as shown in FIG. 7, the seat back side support portion 10 is curved in a bow-like shape to be positioned forward towards the ends in the seat width direction.

Further, as shown in FIG. 5, the notch 11, in an inverted triangular shape extended downward from the upper end of the seat back side support portion 10, is formed in the central portion of the seat back side support portion 10 in the seat width direction. The seat back side support portion 10 is divided into the portion positioned on one end side in the seat width direction (in FIG. 5, the left half portion of the seat back side support portion 10, hereinafter referred to as the first seat back side support portion 12) and the portion positioned on the other end side in the seat width direction (in FIG. 5, the right half portion of the seat back side support portion 10, hereinafter referred to as the second seat back side support portion 13) by the notch 11 formed therebetween.

The seat cushion side support portion 20 forms the lower end portion of the pelvis support member 1 and is arranged in the seat cushion S2 when the pelvis support member 1 is installed to the seating portion Sh of the vehicle seat S. That is, the seat cushion side support portion 20 is positioned below the buttocks of the occupant during the seating period. With regard to the shape of the seat cushion side support portion 20, as shown in FIG. 6, the seat cushion side support portion 20 is slightly wider than the seat back side support portion 10 and has a right and left symmetrical shape having a border at the center of the pelvis support member 1 in the seat width direction.

Further, as shown in FIG. 6, the notch 21, in an inverted triangular shape extended backward from the front end of the seat cushion side support portion 20, is formed in the central portion of the seat cushion side support portion 20 in the seat width direction. Thereby, the seat cushion side support portion 20 is divided into the portion positioned on one end side in the seat width direction (in FIG. 6, the right half portion of the seat cushion side support portion 20, hereinafter referred to as the first seat cushion side support portion 22) and the portion positioned on the other end side in the seat width direction (in FIG. 6, the left half portion of the seat cushion side support portion 20, hereinafter referred to as the second seat cushion side support portion 23) by the notch 21 formed therebetween.

Further, as shown in FIG. 8, each of the first seat cushion side support portion 22 and the second seat cushion side support portion 23 is curved in a bow-like shape to be positioned upward towards the ends in the seat width direction.

The connection portion 30 is arranged directly under the seat back side support portion 10 and connects the lower end of the seat back side support portion 10 and the rear end of the seat cushion side support portion 20. Note that the connection portion 30 is arranged in the seat back S1 when the pelvis support member 1 is installed to the seating portion Sh of the vehicle seat S. That is, the connection portion 30 is positioned behind the back portion of the occupant during the seating period.

With regard to the shape of the connection portion 30, as shown in FIG. 5, the connection portion 30 is formed in an inverted isosceles trapezoid shape becoming narrower as advancing downward in an elevation view. Further, the width of the connection portion 30 (the length in the seat width direction) is shorter than the width of the seat back side support portion 10 and is also shorter than the width of the seat cushion side support portion 20. That is, the pelvis support member 1 is slightly narrowed inwardly in the seat width direction in the position of the connection portion 30.

Further, the connection portion 30 has a right and left symmetrical shape having a border at the center of the pelvis support member 1 in the seat width direction and is curved in a bow-like shape to be positioned forward towards the ends in the seat width direction.

Note that the seat back side support portion 10, the seat cushion side support portion 20, and the connection portion 30 each includes the base portion 1x made of the plate material. The material of the plate material forming the base portion 1x has moderate flexibility. Thus, when a load is applied to the pelvis support member 1, the pelvis support member 1 is bent (elastically deformed) to be moved along a load applying direction at a portion where the load is applied.

Thus, when the seat back side support portion 10 is pressed forward, the seat back side support portion 10 lies down (is inclined forward) toward the seat cushion side support portion 20. Then, the inclination angle of the seat back side support portion 10 with respect to the seat cushion side support portion 20 increases (in other words, the inclination angle of the pelvis support member 1 increases) as the seat back side support portion 10 is inclined forward.

The expression "the inclination angle being increased" described herein means that the seat back side support portion 10 comes closer to the seat cushion side support portion 20 and the angle α shown in FIG. 16 becomes smaller.

Similarly, when the seat cushion side support portion 20 is pressed upward, the seat cushion side support portion 20 rises toward the seat back side support portion 10 (that is, the front end of the cushion side support portion 20 moves upward). Then, the inclination angle of the seat cushion side support portion 20 with respect to the seat back side support portion 10 increases (in other words, the inclination angle of the pelvis support member 1 increases) as the seat cushion side support portion 20 rises.

Note that, when one of the seat back side support portion 10 and the seat cushion side support portion 20 moves toward the other to change the inclination angle of the pelvis support member 1, the lower end of the connection portion 30 serves as an origin. That is, each of the seat back side support portion 10 and the seat cushion side support portion 20 can rotate around the axis along the seat width direction with the lower end of the connection portion 30 as an origin.

The configurations of the seat back side support portion 10, the seat cushion side support portion 20, and the connection portion 30 is now further described. The pelvis-shaped cushion mat 1y is stuck on the surface of the base portion 1x each included in the seat back side support portion 10, the seat cushion side support portion 20, and the connection portion 30. The cushion mat 1y is stuck on the surface of the base portion 1x on a side opposed to the occupant seated on the vehicle seat S and formed into a shape of appropriately fitting to the pelvis site of the occupant. Note that, in the present embodiment, a plurality of the cushion mats 1y are arranged at mutually separated positions.

Movable Mechanism

The movable mechanism 50 is provided for moving the pelvis support member 1 to change the inclination angle of the pelvis support member 1 (in other words, the inclination angle of the seat back side support portion 10 or the seat cushion side support portion 20). As shown in FIG. 16, the movable mechanism 50 according the present embodiment includes the lumbar supports 2, 3, the pump 6, and the air adjusting valve 7.

The lumbar supports 2, 3, which are configured from the air bag, are expanded by filling air into them and contracted by discharging air from them. Further, the lumbar supports 2, 3 are, as is evident from FIG. 17 and FIG. 4, arranged on the back side (the side opposite to the side for supporting the occupant) of the pelvis support member 1 in the seat back S1 and the seat cushion S2. Then, each of the lumbar supports 2, 3 presses the pelvis support member 1 from the back by expansion. In this manner, a portion of the pelvis support member 1 pressed by each of the lumbar supports 2, 3 moves along a pressing direction. Conversely, when each of the lumbar supports 2, 3 is contracted, the portion of the pelvis support member 1 that has been pressed by each of the lumbar supports 2, 3 is released from the pressing force and returns to an original position.

The lumbar supports 2, 3 is described in detail. In the present embodiment, a plurality of the lumbar supports 2, 3 are provided. A first lumbar support 2 (hereinafter referred to as the seat back side lumbar support 2) is arranged behind the seat back side support portion 10 in the seat back S1. This seat back side lumbar support 2 presses the seat back side support portion 10 from behind to move the seat back side support portion 10 such that the seat back side support portion 10 rotates around the axis along the seat width direction with the connection portion 30 as an origin.

Specifically, as shown in FIG. 10A, the seat back side lumbar support 2 is developed in a substantially fan-like shape in a side view during expansion. The seat back side lumbar support 2 expands such that the developing quantity (the expansion quantity) increases towards the upper end. Further, the upper end portion of the seat back side lumbar support 2 is opposed to the upper end portion of the rear surface of the seat back side support portion 10. In this configuration, when the seat back side lumbar support 2 expands to be developed in a substantially fan-like shape, the upper end portion of the seat back side support portion 10 is pressed forward by the seat back side lumbar support 2. In this manner, as shown in FIG. 10A, the seat back side support portion 10 is rotated forward (inclined forward) around the axis (represented by the symbol M in the figure) along the seat width direction with the connection portion 30 as an origin. As a result, the inclination angle of the seat back side support portion 10 with respect to the seat cushion side support portion 20 changes.

A second lumbar support 3 (hereinafter referred to as the seat cushion side lumbar support 3) is arranged at the lower position of the seat cushion side support portion 20 in the seat cushion S2. This seat cushion side lumbar support 3 presses the seat cushion side support portion 20 from the lower side to move the seat cushion side support portion 20 such that the seat cushion side support portion 20 rotates around the axis along the seat width direction with the connection portion 30 as an origin.

Specifically, as shown in FIG. 10B, the seat cushion side lumbar support 3 is developed in a substantially fan-like shape in a side view during expansion. The seat cushion side lumbar support 3 expands such that the developing quantity (the expansion quantity) increases towards the front end. Further, the front end portion of the seat cushion side lumbar support 3 is positioned directly under the front end portion of the lower surface of the seat cushion side support portion 20. In this configuration, when the seat cushion side lumbar support 3 expands to be developed in a substantially fan-like shape, the front end portion of the seat cushion side support portion 20 is pressed upward by the seat cushion side lumbar support 3. In this manner, as shown in FIG. 10B, the seat cushion side support portion 20 is rotated upward (rises) around the axis (represented by the symbol M in the figure) along the seat width direction with the connection portion 30 as an origin. As a result, the inclination angle of the seat cushion side support portion 20 with respect to the seat back side support portion 10 changes.

Note that, as shown in FIG. 4, the rectangular support plate 40 is arranged below the seat cushion side support portion 20. This support plate 40 of relatively large size supports the seat cushion side support portion 20 over a relatively wide range. Then, the seat cushion side lumbar support 3 is arranged below the support plate 40. Thus, the seat cushion side support portion 20 is pressed by the seat cushion side lumbar support 3 via the support plate 40. In this configuration, the seat cushion side support portion 20 is pressed by the seat cushion side lumbar support 3 via the support plate 40, thus making it possible to efficiently move the seat cushion side support portion 20.

As described above, in the present embodiment, the inclination angles of the seat back side support portion 10 and the seat cushion side support portion 20 (that is, the inclination angle of the pelvis support member 1) can be adjusted by changing filling amounts of air in the seat back side lumbar support 2 and the seat cushion side lumbar support 3.

The pump 6 and the air adjusting valve 7 are devices configured to adjust the expansion quantities of the lumbar supports. The pump 6, which is configured as a pump configured to suck and supply air, supplies air to the lumbar supports 2, 3 and sucks air in the lumbar supports 2, 3. Note that, as shown in FIG. 16, two kinds of pumps are used in the present embodiment. One of the pumps (hereinafter referred to as a first pump 6A) is configured to suck and supply air, while the other pump (hereinafter referred to as a second pump 6B) is only configured to supply air. However, the present disclosure is not limited thereto and only the pump configured to suck and supply air may be used.

The air adjusting valve 7 is opened and closed for adjusting an air pressure in each of the lumbar supports 2, 3. Note that, as shown in FIG. 16, five air adjusting valves 7 are used in the present embodiment. A first air adjusting valve 7 (hereinafter referred to as a first inflow valve 7A) is the air adjusting valve 7 that is opened for supplying air to the seat back side lumbar support 2. A second air adjusting valve 7 (hereinafter referred to as a second inflow valve 7B) is the air adjusting valve 7 that is opened for supplying air to the seat cushion side lumbar support 3. A third air adjusting valve 7 (hereinafter referred to as a first suction valve 7C) is the air adjusting valve 7 that is opened for sucking air in the seat back side lumbar support 2. A fourth air adjusting valve 7 (hereinafter referred to as a second suction valve 7D) is the air adjusting valve 7 that is opened for sucking air in the seat cushion side lumbar support 3. A fifth air adjusting valve 7 is an exhaust valve 7E provided for exhausting the air sucked from the seat back side lumbar support 2 and the seat cushion side lumbar support 3.

In this configuration, the expansion quantities of the seat back side lumbar support 2 and the seat cushion side lumbar support 3 can be individually adjusted by switching the opening and closing of the above 5 air adjusting valves 7 accordingly. For example, the seat back side lumbar support 2 can be expanded by supplying air from the pump 6 in a state in which the first inflow valve 7A is opened and the rest of the air adjusting valves 7 are closed.

Further, the expansion quantities of the seat back side lumbar support 2 and the seat cushion side lumbar support 3 can be simultaneously adjusted by adjusting the operation of the pump 6 and the opening and closing of the air adjusting valves 7. For example, the second inflow valve 7B is opened to supply air to the seat cushion side lumbar support 3 from the second pump 6B, while the first suction valve 7C is opened to suck air in the seat back side lumbar support 2 by the first pump 6A. This operation allows an increased expansion quantity of the seat back side lumbar support 2 and, in the same time, decreased expansion quantity of the seat cushion side lumbar support 3.

Further, simultaneously adjusting the expansion quantities of the lumbar supports 2, 3, for example, allows the pelvis support member 1 to swing without changing the inclination angle of the pelvis support member 1. Specifically, the expansion quantity of one of the seat back side lumbar support 2 and the seat cushion side lumbar support 3 is increased and, in the same time, the expansion quantity of the other is decreased by the same quantity. As a result, as shown in FIG. 11A and FIG. 11B, the pelvis support member 1 is caused to swing around the axis (represented by the symbol N in the figures) while the inclination angle is kept constant. The axis described herein serves as a swinging fulcrum of the pelvis support member 1 along the seat width direction and is positioned below the seat cushion side support portion 20.

The kneading unit 80 performs a kneading operation prior to adjustment of the pelvis support member 1 in the case where a second control mode described below is selected. The kneading operation is an operation performed for loosening a muscle of the occupant when the pelvis angle of the occupant is corrected to the ideal angle. The kneading unit 80 is configured from three pairs of right and left air cells (hereinafter referred to as kneading air cells 81) arranged at three places of the seating portion Sh over a region that supports from the waist to the femoral regions of the occupant, that is, a total of six kneading air cells 81. Each of the kneading air cells 81 is expanded by filling air inside the air cell and contracted by exhausting the filled air to the outside. Filling and exhausting air to/from the kneading air cells 81 are achieved by the above-mentioned pumps 6 and air adjusting valves 7. Note that, in FIG. 16, the kneading air cells 81 and suction lines to the kneading air cells 81 are omitted.

With regard to arrangement positions of the kneading air cells 81, first kneading air cells 81 are arranged at positions corresponding to sites of the gluteus maximus in the back portion of the occupant. Specifically, as shown in FIG. 17, each of the first kneading air cells 81 is stuck and fixed to both end portions in the seat width direction of a lower region of the cushion mat 1y that is arranged in the seat back side support portion 10 of the pelvis support member 1.

Second kneading air cells 81 are arranged at positions opposed to positions corresponding to sites of the lower femoral regions in the back portion of the occupant. Specifically, as shown in FIG. 17, each of the second kneading air cells 81 is stuck and fixed to both end portions in the seat width direction of a front region of the cushion mat 1y that is arranged in the seat cushion side support portion 20 of the pelvis support member 1. Third kneading air cells 81 are arranged at positions opposed to positions corresponding to sites below the knees in the back portion of the occupant. Specifically, as shown in FIG. 17, each of the third kneading air cells 81 is stuck and fixed to both end portions in the seat width direction of a front end portion of the pad P forming the seat cushion S2. Note that the number and arrangement positions of the kneading air cells 81 described above are employed by way of example only, and different contents from the above may be used.

Various Sensors

The vehicle seat S has various sensors for measuring the seat state during the seating period. In the present embodiment, the angle sensor 8, the air pressure sensor 9, and a weight sensor 70 are provided.

The angle sensor 8 is a sensor that measures the inclination angle, that is, the inclination angle, of each of the seat back side support portion 10 and the seat cushion side support portion 20 during the seating period. This angle sensor 8 uses a non-contact type known sensor configured to detect the inclination angle. The inclination angle described herein represents a displacement amount expressed by an angle obtained when each of the seat back side support portion 10 and the seat cushion side support portion 20 is displaced from a corresponding initial position. Then, the angle sensor 8 outputs a signal in accordance with a measurement result of the inclination angle to the ECU 60.

Note that, in the present embodiment, one angle sensor 8 is installed to each of the seat back side support portion 10 and the seat cushion side support portion 20. The angle sensor 8 installed to the seat back side support portion 10 measures the inclination angle of the seat back side support portion 10 with respect to the seat cushion side support portion 20 during the seating period. Further, the angle sensor 8 installed to the seat cushion side support portion 20 measures the inclination angle of the seat cushion side support portion 20 with respect to the seat back side support portion 10 during the seating period. Note that only one of the two angle sensors 8 described above may be installed.

The air pressure sensor 9 measures air pressures inside of the seat back side lumbar support 2 and the seat cushion side lumbar support 3. This air pressure sensor 9 uses a known sensor configured to detect the air pressure in the lumbar support and is provided in each lumbar support. Then, the air pressure sensor 9 outputs a signal in accordance with a measurement result of the air pressure to the ECU 60. Note that the air pressure changes in accordance with an air quantity filled in each lumbar support (in other words, the expansion quantity or inflation amount) and a seating pressure applied when the occupant is seated on the vehicle seat S.

The weight sensor 70 measures a variation of the weight of the vehicle seat S caused when the occupant is seated on the vehicle seat S, in other words, the weight of the occupant. This weight sensor 70 uses a known weight sensor for a seat and is installed in a lower position of the seat cushion S2. Then, the weight sensor 70 outputs a signal in accordance with a measurement result of the weight of the occupant to the ECU 60.

ECU

The ECU 60 forms a control portion that controls the movable mechanism 50 and controls the start and stop of the pump 6 and the opening and closing of the air adjusting valve 7 during the seating period. Further, the ECU 60 receives the output signals from the various sensors described above and controls the movable mechanism 50 in accordance with the measurement results of the sensors indicated by the received signals.

Control modes in which the ECU 60 controls the movable mechanism 50 is described. In the present embodiment, four kinds of the control modes are prepared. The occupant selects one mode from the four kinds of the control modes using the operation switch 61. Then, the ECU 60 controls the movable mechanism 50 in accordance with the one mode selected from the four kinds of the control modes.

With regard to four kinds of the control modes, a first control mode, a second control mode, a third control mode, and a forcible exhaustion mode are offered. Each mode is described below.

The first control mode is a mode for adjusting the inclination angle of the pelvis support member 1 to correct the pelvis angle of the occupant to an angle suitable for the occupant. Specifically, the ECU 60 stores, for each occupant, a pre-registered setting value (hereinafter referred to as a first setting value) that is set to each of a plurality of the occupants. This first setting value is a value set as a favorable inclination angle of the pelvis support member 1 for the occupant who continues to sit on the vehicle seat S.

Then, when the ECU 60 controls the movable mechanism 50 in accordance with the first control mode, the ECU 60 reads out the first setting value corresponding to the occupant seated on the vehicle seat S. After that, the ECU 60 controls the movable mechanism 50 so that the inclination angle of the pelvis support member 1 (in other words, the inclination angles of the seat back side support portion 10 and the seat cushion side support portion 20) becomes the first setting value that is read out.

The second control mode is a mode for adjusting the inclination angle of the pelvis support member 1 to correct the pelvis angle of the occupant to an "ideal" angle. Specifically, the ECU 60 stores, for each occupant, a pre-registered setting value (hereinafter referred to as a second setting value) that is set to each of a plurality of the occupants. This second setting value is a value set as a favorable inclination angle of the pelvis support member 1 for correcting the pelvis angle of the occupant to the ideal angle.

Then, when the ECU 60 controls the movable mechanism 50 in accordance with the second control mode, the ECU 60 reads out the second setting value corresponding to the occupant seated on the vehicle seat S. After that, the ECU 60 controls the movable mechanism 50 so that the inclination angle of the pelvis support member 1 (in other words, the inclination angles of the seat back side support portion 10 and the seat cushion side support portion 20) becomes the second setting value that is read out.

As described above, the first control mode and the second control mode are common in controlling the movable mechanism 50 such that the inclination angle of the pelvis support member 1 becomes the setting value corresponding to the occupant seated on the vehicle seat S. On the other hand, the first setting value and the second setting value set for the same occupant are different from each other. For example, the second setting value is set such that the variation of the inclination angle is larger than that of the first setting value.

Note that, when the second control mode is selected, ECU 60 controls the pump 6 and the air adjusting valves 7 of the movable mechanism 50 to expand and contract the kneading air cells 81 that form the kneading unit 80 (in other words, to perform the kneading operation).

The third control mode is a mode for swinging the entire pelvis support member 1 while keeping the inclination angle of the pelvis support member 1 constant for the purpose of training a muscle located in the pelvis site of the occupant. Specifically, in the third control mode, the expansion quantities of the seat back side lumbar support 2 and the seat cushion side lumbar support 3 are simultaneously adjusted.

More specifically, the expansion quantity of the seat back side lumbar support 2 is increased by a certain quantity and, at the same time, the expansion quantity of the seat cushion side lumbar support 3 is decreased by the same quantity. In this operation, the pelvis support member 1 is moved to be inclined forward while the inclination angle is kept constant. Subsequently, the expansion quantities of the seat back side lumbar support 2 and the seat cushion side lumbar support 3 are changed by a reverse procedure of the above-mentioned procedure. In this operation, the pelvis support member 1 is moved to be inclined backward while the inclination angle is kept constant. The pelvis support member 1 performs a reciprocal movement in a swinging direction around the axis (represented by the symbol N in FIG. 11A and FIG. 11B) along the seat width direction by repeating the above-mentioned procedures.

Note that, when the ECU 60 controls the movable mechanism 50 in accordance with the third control mode, the ECU 60 controls the movable mechanism 50 so that the pelvis support member 1 performs the reciprocal movement in the swinging direction by a specified number of times. That is, the ECU 60 stops the swinging operation when the pelvis support member 1 completes the reciprocal movement in the swinging direction by the specified number of times, and then controls the movable mechanism 50 so that the pelvis support member 1 is returned to a predetermined position (e.g., the initial position).

The forcible exhaustion mode is a mode for forcibly exhausting the air from the seat back side lumbar support 2 and the seat cushion side lumbar support 3. Specifically, air suction is performed by the first pump 6A in a state in which the first suction valve 7C, the second suction valve 7D, and the exhaust valve 7E are opened. This operation exhausts the air from the seat back side lumbar support 2 and the seat cushion side lumbar support 3.

Note that, in the present embodiment, four kinds of the modes mentioned above are included as the control modes, however, the kind and the number of the control modes are not particularly limited, and, for example, a mode other than the four kinds of the modes mentioned above may be further included.

In the present embodiment, the ECU 60 has a function of identifying the occupant seated on the vehicle seat S. That is, the ECU 60 according to the present embodiment forms an occupant identification portion for identifying the occupant seated on the vehicle seat S.

Specifically, at a time point when the occupant starts sitting on the vehicle seat S (that is, a starting time point of the seating period), the angle sensor 8 measures each of the inclination angles of the seat back side support portion 10 and the seat cushion side support portion 20 at that time point and the weight sensor 70 measures the seat weight (that is, the weight of the occupant) at that time point. The ECU 60 receives the output signals from the angle sensor 8 and the weight sensor 70 and determines the measurement results at the starting time point of the seating period.

Further, the ECU 60 stores information regarding the variation of the inclination angle of the pelvis support member 1 caused when the occupant is seated on the vehicle seat S and information regarding the weight of that occupant for each of the plurality of the pre-registered occupants. Then, when the ECU 60 determines the measurement results of the angle sensor 8 and the weight sensor 70 at the starting time point of the seating period, the ECU 60 can identify the occupant by collating the determined measurement results with the above-mentioned information.

As described above, in the present embodiment, the ECU 60 identifies the occupant on the basis of the measurement results of the angle sensor 8 and the weight sensor 70, however, the present disclosure is not limited thereto. The occupant may be identified on the basis of information other than the measurement results of the angle sensor 8 and the weight sensor 70, for example, occupant information that is input by the occupant using an input device not illustrated, image information of the occupant that is photographed by a camera installed in the vehicle, or occupant information that is obtained by communicating with an information terminal (a smartphone, etc.) carried by the occupant. Further, the occupant may be identified by a device different from the ECU 60.

Operation Examples of Seating Device Adjustment Unit

Figure 18:
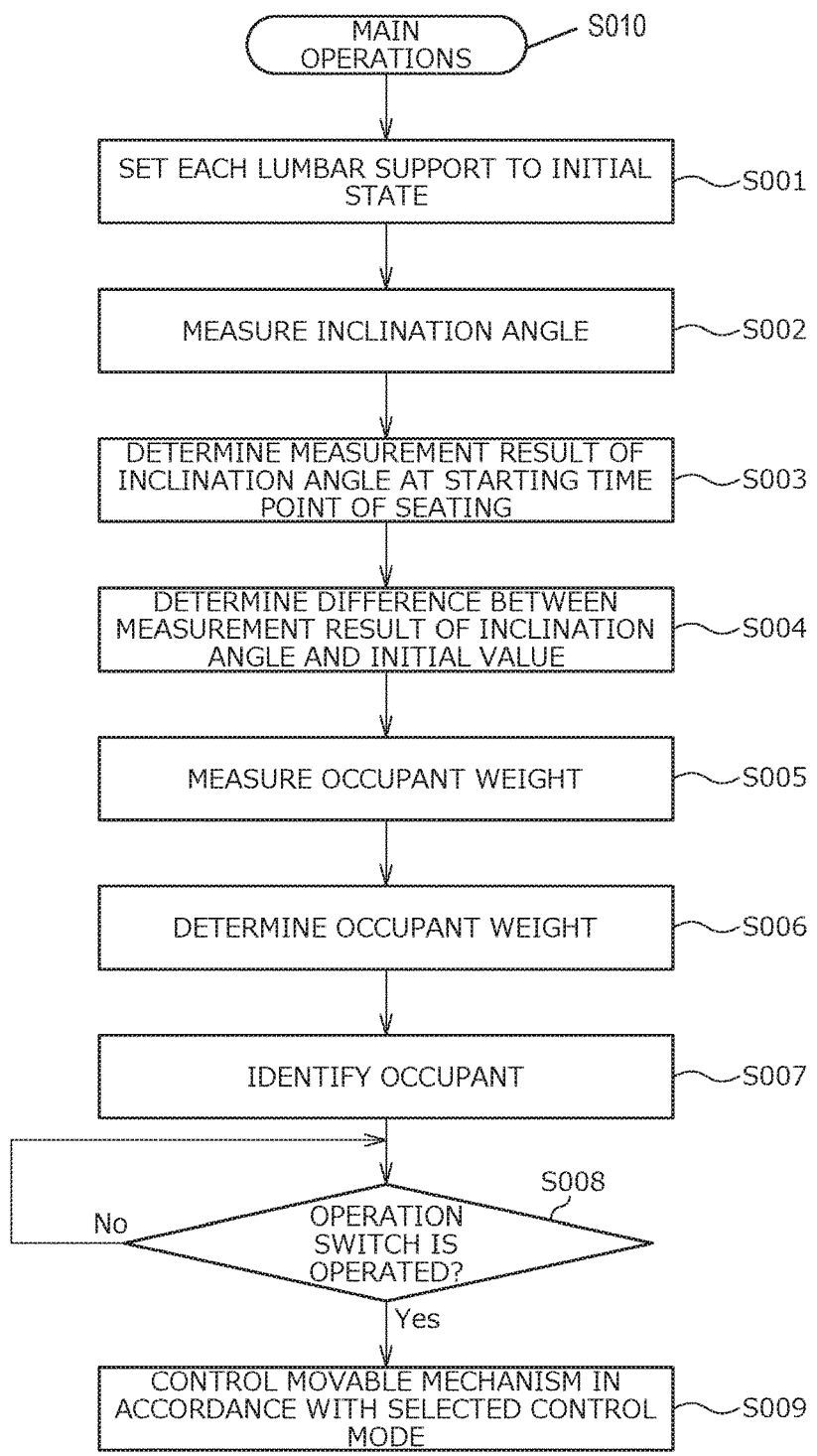
FIG. 18 is a flowchart illustrating main operations in an ECU control.

Hitherto, the seating device adjustment unit 100 has been described. Next, operation examples of the seating device adjustment unit 100 are described. A state adjustment (hereinafter referred to as an adjustment processing) of the vehicle seat S by the seating device adjustment unit 100 is started, for example, when the occupant gets into the vehicle. Further, main operations of the adjustment processing proceed in accordance with procedures shown in FIG. 18.

Specifically, in the main operations, the ECU 60 first controls the movable mechanism 50 to set each of the seat back side lumbar support 2 and the seat cushion side lumbar support 3 into an initial state in a non-seating period during which the occupant is not seated on the vehicle seat S (S010). More specifically, the ECU 60 controls the movable mechanism 50 to fill air into each of the seat back side lumbar support 2 and the seat cushion side lumbar support 3 by a specified quantity before the occupant is seated on the vehicle seat S. This operation allows each of the seat back side lumbar support 2 and the seat cushion side lumbar support 3 to expand until the inclination angle of each lumbar support becomes an initial value.

Note that the ECU 60 stores the initial value of the inclination angle and the air pressure corresponding to the initial value for each of the seat back side lumbar support 2 and the seat cushion side lumbar support 3. Then, the ECU 60 expands the seat back side lumbar support 2 and the seat cushion side lumbar support 3 until the inclination angles become the initial values in step S001. During this step, the ECU 60 monitors the measurement results of the air pressure sensor 9 and stops the air supply when the measurement results reach the air pressures corresponding to the initial values.

Then, when the occupant is seated on the vehicle seat S, the pelvis site of the occupant is supported by the pelvis support member 1. Accordingly, each of the inclination angles of the seat back side lumbar support 2 and the seat cushion side lumbar support 3 changes. The angle sensors 8 measure the inclination angles of the seat back side lumbar support 2 and the seat cushion side lumbar support 3 at that time point (that is, the starting time point of the seating period) and output the signals corresponding to the measurement results (S002). The ECU 60 receives the output signals from the angle sensors 8 and determines the measurement results of the inclination angles at the starting time point of the seating period (S003).

On the other hand, the ECU 60 stores the inclination angle of each of the seat back side lumbar support 2 and the seat cushion side lumbar support 3 adjusted into the initial state during the non-seating period, that is, the initial value of the inclination angle. Then, the ECU 60 determines a difference between the measurement result of the inclination angle determined in step S003 and the initial value of the inclination angle (S004).

Further, when the occupant is seated on the vehicle seat S, the weight sensor 70 measures the seat weight, that is, the weight of the occupant, at that time point and outputs the signal corresponding to the measurement result (S005). The ECU receives the output signal from the weight sensor 70 and determines the weight of the occupant seated on the vehicle seat S (S006).

Then, ECU 60 identifies the occupant seated on the vehicle seat S on the basis of the difference between the measurement result of the inclination angle and the initial value determined in step S004 and the weight of the occupant determined in step S006 (S007).

Subsequently, when the operation switch 61 is operated by the occupant (S008), the ECU 60 controls the movable mechanism 50 by using the switching operation as a trigger. More specifically, the ECU 60 determines the control mode selected by the occupant using the operation switch 61 to control the movable mechanism 50 (S009). After that, the ECU 60 controls the movable mechanism 50 in accordance with the determined control mode. The control of the movable mechanism 50 in each of the control modes is completed when a corresponding control completion condition is satisfied. The control operations in each of the control modes is described in detail below.

Figure 19:
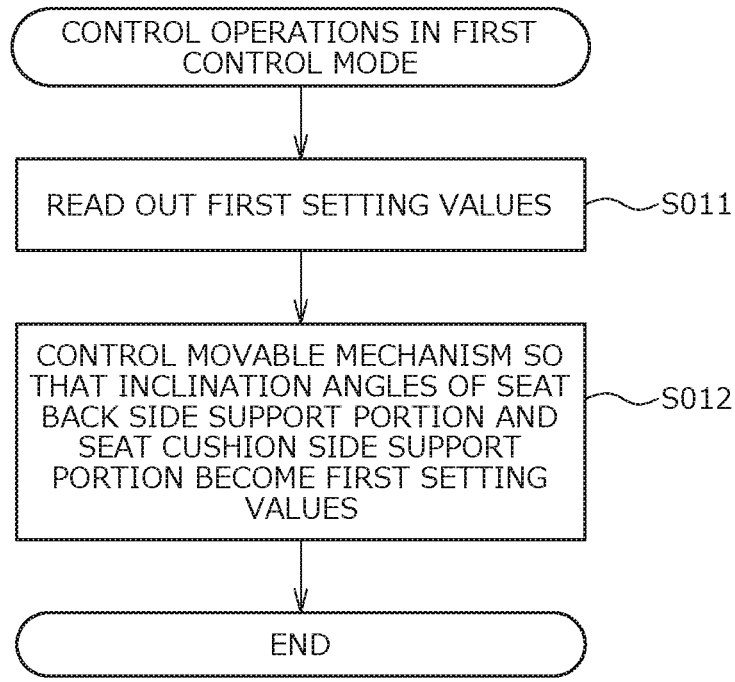
FIG. 19 is a flowchart illustrating the ECU control in a first control mode.

In a case where the first control mode is selected, the ECU 60 controls the movable mechanism 50 in accordance with the procedures shown in FIG. 19. Specifically, the ECU 60 first reads out the first setting value corresponding to the occupant identified in step S007 from the first setting values stored for each occupant (S011). Then, the ECU 60 controls the movable mechanism 50 so that each of the inclination angles of the seat back side support portion 10 and the seat cushion side support portion 20 becomes the first setting value (S012).

More specifically, the ECU 60 calculates a difference between the inclination angle at the present time point and the first setting value. Then, the ECU 60 controls the pumps 6 and the air adjusting valves 7 so that air of the quantity corresponding to the calculated difference is supplied to or sucked from the seat back side lumbar support 2 and the seat cushion side lumbar support 3. In this manner, each of the expansion quantities of the seat back side lumbar support 2 and the seat cushion side lumbar support 3 is adjusted so that the inclination angles of the seat back side support portion 10 and the seat cushion side support portion 20 become the first setting values.

Note that, when controlling the movable mechanism 50 in accordance with the first control mode, the ECU 60 monitors the air pressures of the seat back side lumbar support 2 and the seat cushion side lumbar support 3 measured by the air pressure sensors 9. Then, the ECU 60 completes the control of the movable mechanism 50 when the measurement results of the air pressure sensors 9 reach the air pressures corresponding to the first setting values.

As described above, in the first control mode, the movable mechanism 50 is controlled so that each of the inclination angles of the seat back side support portion 10 and the seat cushion side support portion 20 becomes the first setting value. The first setting value described herein is a value corresponding to the occupant seated on the vehicle seat S, specifically, a value corresponding to the occupant identified by the ECU 60 from the measurement results of the angle sensors 8 and the weight sensor 70. In this sense, the first control mode is a mode that controls the movable mechanism 50 in accordance with the identification result of the occupant and the measurement results of the angle sensors 8 and the weight sensor 70.

Further, in the present embodiment, the occupant is identified from the difference between the measurement results of the inclination angles at the starting time point of the seating period and the initial values of the inclination angles. Thus, the first control mode is a mode that controls the movable mechanism 50 in accordance with the initial values of the inclination angles and the measurement results of the angle sensors 8 during the seating period.

Figure 20:
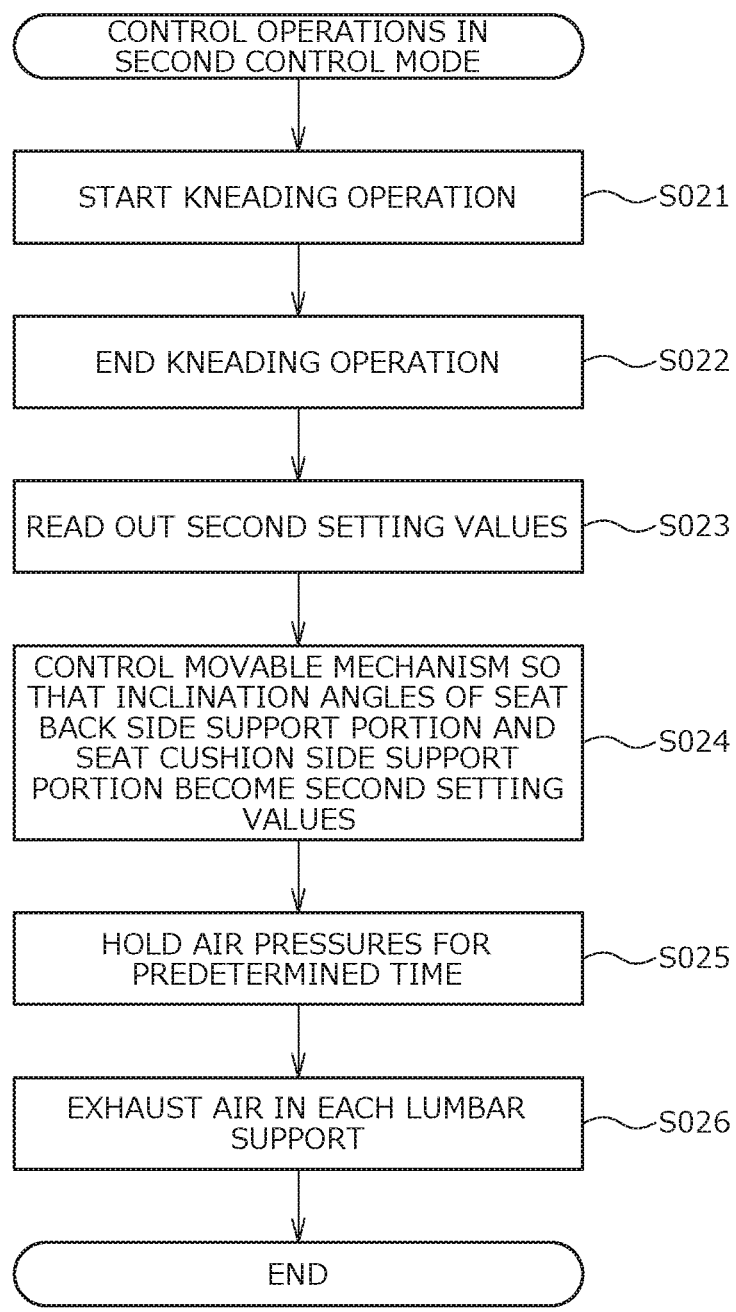
FIG. 20 is a flowchart illustrating the ECU control in a second control mode.

Next, a description is given of a case where the second control mode is selected. In the second control mode, the ECU 60 controls the movable mechanism 50 in accordance with the procedures shown in FIG. 20. Specifically, the ECU 60 first controls the pumps 6 and the air adjusting valves 7 of the movable mechanism 50 to expand and contract each of the kneading air cells 81 of the kneading unit 80, thereby starting the kneading operation (S021). In this operation, a plurality of patterns are provided for the kneading operation. In the present embodiment, three patterns (kneading patterns) are provided.

In a first kneading pattern, all six of the kneading air cells 81 are expanded at the same timing and are also contracted at the same timing. In a second kneading pattern, after the kneading air cells 81 arranged at the positions corresponding to the portions below the knees of the occupant are expanded and contracted, the kneading air cells 81 arranged at the positions corresponding to the lower portions of the femoral regions of the occupant are expanded and contracted, and then the kneading air cells 81 arranged at the positions corresponding to the gluteus maximus of the occupant are expanded and contracted. In a third kneading pattern, the kneading air cells 81 arranged at the positions corresponding to the portions below the knees of the occupant and the kneading air cells 81 arranged at the positions corresponding to the gluteus maximus of the occupant are simultaneously expanded, and after these kneading air cells 81 are simultaneously contracted, the kneading air cells 81 arranged at the positions corresponding to the lower portions of the femoral regions of the occupant are expanded and contracted.

The ECU 60 controls the movable mechanism 50 so that the kneading operation is performed in the set pattern selected from the three kneading patterns described above. Then, after the kneading operation is continued for a predetermined period of time, the ECU 60 temporarily stops the movable mechanism 50 to terminate the kneading operation (S022).

Subsequently, the ECU 60 reads out the second setting value corresponding to the occupant identified in step S007 from the second setting values stored for each occupant (S023). After that, the ECU 60 controls the movable mechanism 50 so that each of the inclination angles of the seat back side support portion 10 and the seat cushion side support portion 20 becomes the second setting value (S024).

More specifically, the ECU 60 calculates a difference between the inclination angle at the present time point and the second setting value. Then, the ECU 60 controls the pumps 6 and the air adjusting valves 7 so that air of the quantity corresponding to the calculated difference is supplied to or sucked from the seat back side lumbar support 2 and the seat cushion side lumbar support 3. In this manner, each of the expansion quantities of the seat back side lumbar support 2 and the seat cushion side lumbar support 3 is adjusted so that the inclination angles of the seat back side support portion 10 and the seat cushion side support portion 20 become the second setting values.

Note that, when controlling the movable mechanism 50 in accordance with the second control mode, the ECU 60 monitors the air pressures of the seat back side lumbar support 2 and the seat cushion side lumbar support 3 measured by the air pressure sensors 9. Then, when the measurement results of the air pressure sensors 9 reach the air pressures corresponding to the second setting values, the ECU 60 controls the movable mechanism 50 so that the air pressures at that time point are maintained for a predetermined period of time (S025). Then, after a holding time of the air pressures reaches the predetermined period of time, the ECU 60 controls the movable mechanism 50 so that the air of the seat back side lumbar support 2 and the seat cushion side lumbar support 3 is exhausted (S026). Finally, after the air of the seat back side lumbar support 2 and the seat cushion side lumbar support 3 is completely exhausted, the ECU 60 terminates the control of the movable mechanism 50.

As described above, in the second control mode, the movable mechanism 50 is controlled so that each of the inclination angles of the seat back side support portion 10 and the seat cushion side support portion 20 becomes the second setting value. The second setting value described herein is a value corresponding to the occupant seated on the vehicle seat S, specifically, a value corresponding to the occupant identified by the ECU 60 from the measurement results of the angle sensors 8 and the weight sensor 70. In this sense, the second control mode is a mode that controls the movable mechanism 50 in accordance with the identification result of the occupant and the measurement results of the angle sensors 8 and the weight sensor 70.

Further, in the present embodiment, the occupant is identified from the difference between the measurement results of the inclination angles at the starting time point of the seating period and the initial values of the inclination angles. Thus, the second control mode is a mode that controls the movable mechanism 50 in accordance with the initial values of the inclination angles and the measurement results of the angle sensors 8 during the seating period.

Figure 21:
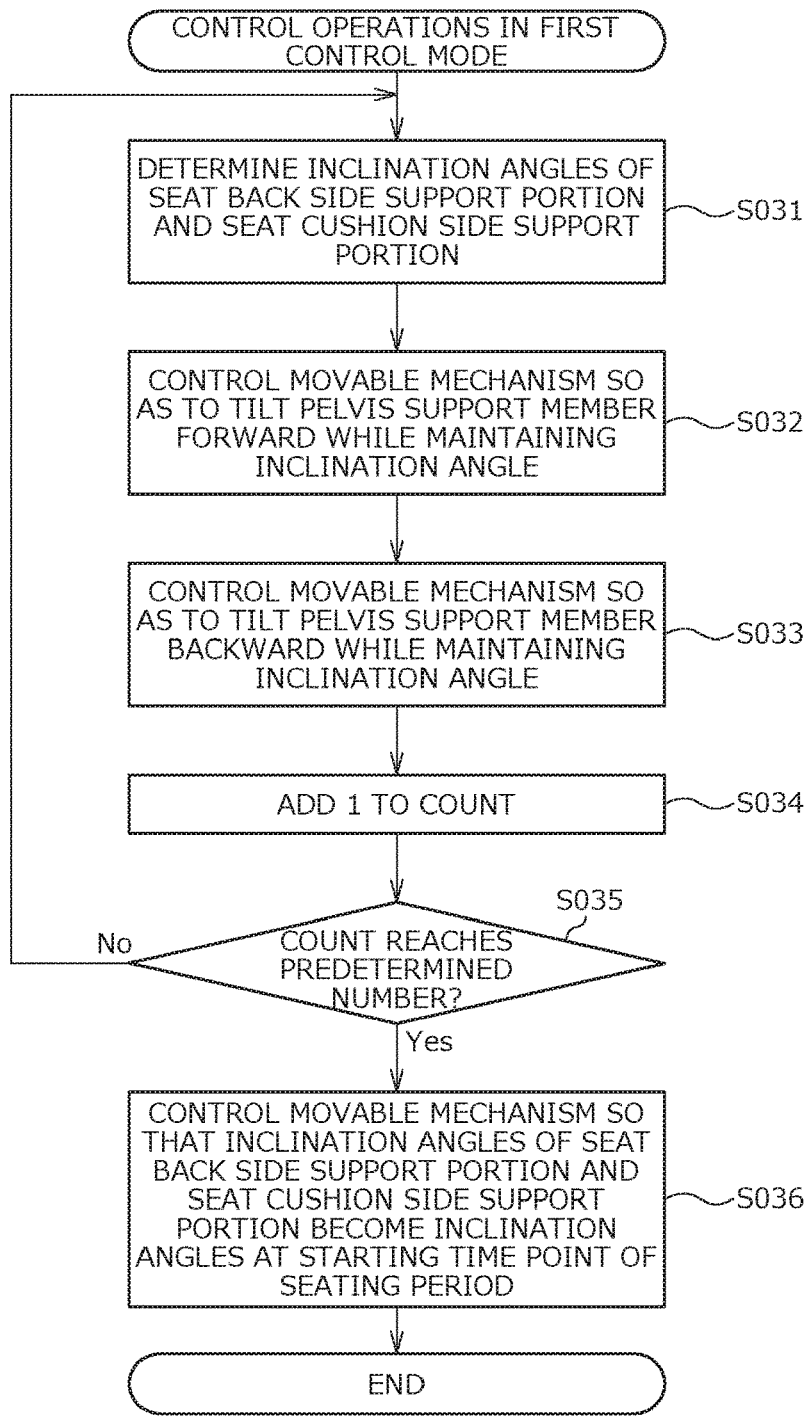
FIG. 21 is a flowchart illustrating the ECU control in a third control mode.

Next, a description is given of a case where the third control mode is selected. In the third control mode, the ECU 60 controls the movable mechanism 50 in accordance with the procedures shown in FIG. 21. Specifically, the ECU 60 first determines each of the inclination angles of the seat back side support portion 10 and the seat cushion side support portion 20 at that time point (S031). After that, the ECU 60 controls the movable mechanism 50 to tilt the entire pelvis support member 1 forward while maintaining the determined inclination angle (S032).

Specifically, the ECU 60 controls the movable mechanism 50 so that the expansion quantities of the seat back side lumbar support 2 and the seat cushion side lumbar support 3 are simultaneously adjusted. In this operation, the expansion quantity of the seat back side lumbar support 2 is increased by a quantity necessary to tilt the seat back side support portion 10 forward by a specified angle. On the other hand, the expansion quantity of the seat cushion side lumbar support 3 is decreased by a quantity corresponding to the increase of the expansion quantity of the seat back side lumbar support 2. As a result, the pelvis support member 1 is inclined forward by the specified angle while maintaining its inclination angle.

Subsequently, the ECU 60 controls the movable mechanism 50 so that each of the expansion quantities of the seat back side lumbar support 2 and the seat cushion side lumbar support 3 is adjusted by reverse procedures of the above-mentioned procedures (S033). In these procedures, the expansion quantity of the seat cushion side lumbar support 3 is increased by a quantity necessary to tilt the seat back side support portion 10 backward by a specified angle. On the other hand, the expansion quantity of the seat back side lumbar support 2 is decreased by a quantity corresponding to the increase of the expansion quantity of the seat cushion side lumbar support 3. As a result, the pelvis support member 1 is inclined backward by the specified angle while maintaining its inclination angle.

The ECU 60 controls the movable mechanism 50 so that the pelvis support member 1 alternately repeats the forward-inclination operation and backward-inclination operation described above. Further, the ECU 60 counts the number of the swinging operation, specifically, the ECU 60 increases the number of counts by 1 every time the forward-inclination operation and backward-inclination operation of the pelvis support member 1 are performed (S034).

Then, when the number of counts reaches a predetermined number (S035), the ECU 60 terminates the control for swinging the pelvis support member 1. Subsequently, the ECU 60 controls the movable mechanism 50 so that each of the inclination angles of the seat back side support portion 10 and the seat cushion side support portion 20 is returned to the angle determined in step S003 (that is, the inclination angle at the starting time point of the seating period) (S036). Then, when each of the inclination angles of the seat back side support portion 10 and the seat cushion side support portion 20 is returned to the inclination angle at the starting time point of the seating period, the ECU 60 terminates the control of the movable mechanism 50.

Next, a description is given of a case where the forcible exhaustion mode is selected. In the forcible exhaustion mode, the ECU 60 controls the movable mechanism 50 so that each of the air pressures of the seat back side lumbar support 2 and the seat cushion side lumbar support 3 is decreased to a predetermined value (S041). Further, when each of the air pressures of the seat back side lumbar support 2 and the seat cushion side lumbar support 3 is decreased to the predetermined value, the ECU 60 controls the movable mechanism 50 so that each of the inclination angles of the seat back side support portion 10 and the seat cushion side support portion 20 is returned to the angle determined in step S003 (that is, the inclination angle at the starting time point of the seating period) (S042). Then, when each of the inclination angles of the seat back side support portion 10 and the seat cushion side support portion 20 is returned to the inclination angle at the starting time point of the seating period, the ECU 60 terminates the control of the movable mechanism 50.

Other Embodiments

Thus far, the configurations of the seating device adjustment unit for adjusting the seat state of the vehicle seat S has been described as an embodiment of the present disclosure. However, the above embodiment is merely an example for facilitating understanding of the present disclosure, and the present disclosure is not limited thereto. That is, the present disclosure may be modified or improved without departing from the gist of the present disclosure and such equivalents are also included in the present disclosure.

Further, in the above embodiment, the lumbar support (the air bag) that is freely expandable by the inflow and outflow of air is used as the movable mechanism. However, the present disclosure is not limited thereto, and other movable mechanisms (specifically, a mechanism in which each portion of the pelvis support member 1 is moved by the traction of a wire or a mechanism in which each portion of the pelvis support member 1 is moved using a retractably movable rod) may be used.

Further, in the above embodiment, the seat back side support portion 10 and the seat cushion side support portion 20 are rotated around the axis along the seat width direction to move the pelvis support member 1. However, the directions in which the seat back side support portion 10 and the seat cushion side support portion 20 are moved are not particularly limited, and the seat back side support portion 10 and the seat cushion side support portion 20 may be moved linearly in a front to back direction or a up and down direction.

The seating device adjustment unit according to the above embodiment is arranged in the vehicle seat S and enables appropriate adjustment of the pelvis degree of the occupant by the pelvis support member while the occupant is seated on the seating device provided with the pelvis support member. Various embodiments of the seating device adjustment unit are as follows.

In a first embodiment, a seating device adjustment unit includes: a seating device having a seat back and a seat cushion; a seat back side support portion arranged in the seat back; and a seat cushion side support portion arranged in the seat cushion, and further including: a pelvis support member for supporting a portion where a pelvis is positioned in an occupant's body; a sensor for measuring an inclination angle of at least one of the seat back side support portion and the seat cushion side support portion; a movable mechanism configured to move the pelvis support member to change the inclination angle; a control portion for controlling the movable mechanism; and an occupant identification portion for identifying an occupant seated on the seating device, in which the control portion controls the movable mechanism in accordance with an identification result by the occupant identification portion and a measurement result by the sensor while the occupant is seated on the seating device.

According to the seating device adjustment unit having the configuration described above, the pelvis support member including the seat back side support portion and the seat cushion side support portion is arranged in the seating device. Further, an inclination angle of at least one of the seat back side support portion and the seat cushion side support portion is changed in accordance with a shape of the body (more specifically, a portion where the pelvis is positioned in the body) of the occupant seated on the seating device. Further, the above-mentioned inclination angle is adjusted such that the pelvis support member is moved by the movable mechanism. Further, the movable mechanism is controlled by the control portion. In this operation, the control portion controls the movable mechanism in accordance with a measurement result of the inclination angle by the sensor and an identification result of the occupant seated on the seating device. In this manner, the above-mentioned inclination angle is adjusted in accordance with the measurement result at the time when the movable mechanism is controlled and the occupant seated on the seating device. As a result, the pelvis angle of the occupant is appropriately adjusted while the occupant is seated on the seating device.

In a second embodiment of a seating device adjustment unit similar to the first embodiment, it is preferable that the movable mechanism moves the pelvis support member so that the inclination angle becomes an initial value in a non-seating period during which the occupant is not seated on the seating device, the sensor measures the inclination angle in a seating period during which the occupant is seated on the seating device, and the control portion controls the movable mechanism in accordance with the initial value of the inclination angle and the measurement result of the sensor in the seating period. According to the above configuration, the control portion controls the movable mechanism in accordance with the initial value of the inclination angle and the measurement result of the sensor in the seating period. In this manner, the inclination angle can be more appropriately adjusted in accordance with a variation of the inclination angle caused when the occupant is seated on the seating device.

In a third embodiment of a seating device adjustment unit similar to the first embodiment, it is preferable that the control portion controls the movable mechanism in accordance with one mode selected from a plurality of control modes, the plurality of the control modes include a first control mode and a second control mode, in the first control mode, the control portion controls the movable mechanism so that the inclination angle is changed to a first setting value corresponding to the identification result by the occupant identification portion among the first setting values set for each occupant, in the second control mode, the control portion controls the movable mechanism so that the inclination angle is changed to a second setting value corresponding to the identification result by the occupant identification portion among the second setting values set for each occupant, and the first setting value and the second setting value set for the same occupant are different from each other. According to the above configuration, the plurality of the control modes are prepared when the control portion controls the movable mechanism. Further, among the plurality of the control modes, the first control mode and the second control mode have the different setting values for adjusting the inclination angle. Thus, when the control mode having the smaller setting value is selected between the first control mode and the second control mode, the inclination angle can be adjusted more gently. Conversely, when the control mode having the larger setting value is selected, the inclination angle can be adjusted more eminently. As described above, in the above configuration, there are more variations in adjusting the inclination angle.

In a fourth embodiment of a seating device adjustment unit similar to the third embodiment, it is preferable that the plurality of the control modes include a third control mode, and, in the third control mode, the control portion controls the movable mechanism to swing the pelvis support member while keeping the inclination angle constant. According to the above configuration, the control mode (the third control mode) for controlling the movable mechanism to swing the pelvis support member while keeping the inclination angle constant is further included. Then, in the case where the third control mode is selected, the portion where the pelvis is positioned in the occupant's body can be stimulated by swinging the pelvis support member. As a result, the body of the occupant can be trained.

In a fifth embodiment of a seating device adjustment unit similar to the fourth embodiment, it is preferable that, in the third control mode, the control portion controls the movable mechanism so that the pelvis support member performs a reciprocal movement in a swinging direction around an axis along a width direction of the seating device by a specified number of times. According to the above configuration, when the control portion controls the movable mechanism in accordance with the third control mode, the pelvis support member performs the reciprocal movement (swinging) in a front to back direction by the specified number of times. In this manner, the portion where the pelvis is positioned in the occupant's body can be effectively trained.

In a sixth embodiment of a seating device adjustment unit similar to the first embodiment, it is preferable that, the sensor measures the inclination angle in the seating period during which the occupant is seated on the seating device, and the occupant identification portion identifies the occupant seated on the seating device on the basis of the measurement result of the sensor at a starting time point of the seating period. According to the above configuration, the occupant seated on the seating device is identified by using the measurement result of the sensor at the starting time point of the seating period (that is, the inclination angle at a time point when the occupant starts sitting on the seating device). In this manner, identification accuracy of the occupant can be improved.

In a seventh embodiment of a seating device adjustment unit similar to the first embodiment, the seating device is preferably a vehicle seat installed in a vehicle. According to the above configuration, the seating device is the vehicle seat, thus the pelvis angle of the occupant can be adjusted while the occupant is seated on the vehicle seat.

TABLE OF REFERENCE NUMERALS

1: Pelvis support member
   1a: Support surface

1b: Protruding region
1c: Recessed region
1x: Base portion
1y: Cushion mat
2: Seat back side lumbar support (movable mechanism, first movable mechanism)
3: Seat cushion side lumbar support (movable mechanism, first movable mechanism)
4: Upper side lumbar support (second movable mechanism)
5: Lower side lumbar support (second movable mechanism)
6: Pump
   6A: First pump
   6B: Second pump
7: Air adjusting valve
   7A: First inflow valve
   7B Second inflow valve
   7C First suction valve
   7D Second suction valve
   7E Exhaust valve
8: Angle sensor (sensor)
9: Air pressure sensor
10: Seat back side support portion
11: Notch
12: First seat back side support portion
13: Second seat back side support portion
20: Seat cushion side support portion
21: Notch
22: First seat cushion side support portion
23: Second seat cushion side support portion
30: Connection portion
40: Support plate
50: Movable mechanism
60: ECU
61: Operation switch
70: Weight sensor
80: Kneading unit
81: Kneading air cell
100: Seating device adjustment unit
F: Seat back frame
FP: Pressure receiving member
FP1: Elastic spring
FP2: Resin plate
FS: Side frame
P: Pad
S: Vehicle seat
Sh: Seating portion
S1: Seat back
S2: Seat cushion
S3: Headrest

What is claimed is:

1. A conveyance seat comprising:
a seating portion having a seat back and a seat cushion;
a pelvis support member arranged in the seating portion and configured to support a portion of an occupant's body where a pelvis is positioned; and
a movable mechanism configured to move the pelvis support member, wherein:
the pelvis support member includes:
a seat back side support portion arranged in the seat back and positioned behind a back portion of the occupant; and
a seat cushion side support portion arranged in the seat cushion and positioned below buttocks of the occupant; and
a connection portion that connects the seat back side support portion and the seat cushion side support portion; and the movable mechanism is configured to move the pelvis support member so that a position of at least one of the seat back side support portion and the seat cushion side support portion is changed with respect to the portion where the pelvis is positioned;
the seat back side support portion includes a back side support surface that is positioned on the same side as the occupant seated on the conveyance seat;
the seat back side support portion includes a sensor that detects an inclination angle of one of the seat back side support portion and the seat cushion side support portion with respect to the other and outputs a signal in accordance with the inclination angle; and
the sensor is installed in a central region of the back side support surface in a width direction of the conveyance seat.

2. The conveyance seat according to claim 1, wherein:
the back side support surface of the seat back side support portion includes a recessed region that is formed on a portion of the back side support surface at a position recessed deeper than a peripheral region of the recessed region; and
the sensor is installed in the recessed region.

3. The conveyance seat according to claim 1, wherein:
the seat back side support portion is divided into a first seat back side support portion positioned on one end side in the width direction of the conveyance seat and a second seat back side support portion positioned on an other end side;
the seat cushion side support portion is divided into a first seat cushion side support portion positioned on the one end side in the width direction and a second seat cushion side support portion positioned on the other end side; and
the movable mechanism is configured to individually move each of the first seat back side support portion and the second seat back side support portion and is also configured to individually move each of the first seat cushion side support portion and the second seat cushion side support portion.

4. The conveyance seat according to claim 1, wherein:
the seat cushion side support portion has a cushion side support surface that is positioned on the same side as the occupant seated on the conveyance seat;
the back side support surface of the seat back side support portion is curved forward toward ends of the back side support surface in the width direction of the conveyance seat; and
the cushion side support surface of the seat cushion side support portion is curved upward toward ends of the cushion side support surface in the width direction.

5. The conveyance seat according to claim 1, wherein:
the movable mechanism is configured to move the pelvis support member so that at least one of the seat back side support portion and the seat cushion side support portion is rotated around an axis along the width direction of the conveyance seat with the connection portion as an origin; and
a length of the connection portion in the width direction of the conveyance seat is shorter than a length of the seat back side support portion in the width direction and is also shorter than a length of the seat cushion side support portion in the width direction.

6. The conveyance seat according to claim 1, wherein:
the seat cushion side support portion has a cushion side support surface that is positioned on the same side as the occupant seated on the conveyance seat; and the movable mechanism includes:
  a first movable mechanism configured to move the pelvis support member so that at least one of the seat back side support portion and the seat cushion side support portion is rotated around the axis along the width direction of the conveyance seat with the connection portion as an origin; and
  a second movable mechanism configured to move the pelvis support member so that end regions, in the width direction, of at least one of the back side support surface and the cushion side support surface are moved inward in the width direction.

7. The conveyance seat according to claim 1, wherein:
the seat back includes a pressure receiving member that is elastically deformable to be displaced backward by being pressed by a back of the occupant when a backward load acts on the occupant;
the movable mechanism is fixed to the pressure receiving member;
the seat back side support portion is attached to the movable mechanism; and
the movable mechanism and the seat back side support portion are integrally moved backward along with the pressure receiving member when the backward load acts on the occupant.

8. A conveyance seat comprising:
a seating portion having a seat back and a seat cushion;
a pelvis support member arranged in the seating portion and configured to support a portion of an occupant's body where a pelvis is positioned; and
a movable mechanism configured to move the pelvis support member, wherein:
the pelvis support member includes:
  a seat back side support portion arranged in the seat back and positioned behind a back portion of the occupant; and
  a seat cushion side support portion arranged in the seat cushion and positioned below buttocks of the occupant;
the movable mechanism is configured to move the pelvis support member so that a position of at least one of the seat back side support portion and the seat cushion side support portion is changed with respect to the portion where the pelvis is positioned;
the seat back side support portion includes a back side support surface that is positioned on the same side as the occupant seated on the conveyance seat;
the back side support surface of the seat back side support portion includes a recessed region that is formed on a portion of the back side support surface at a position recessed deeper than a peripheral region of the recessed region;
the seat back side support portion includes a sensor that detects an inclination angle of one of the seat back side support portion and the seat cushion side support portion with respect to the other and outputs a signal in accordance with the inclination angle; and
the sensor is installed in the recessed region.

9. The conveyance seat according to claim 8, wherein:
the seat back side support portion is divided into a first seat back side support portion positioned on one end side in the width direction of the conveyance seat and a second seat back side support portion positioned on an other end side;
the seat cushion side support portion is divided into a first seat cushion side support portion positioned on the one end side in the width direction and a second seat cushion side support portion positioned on the other end side; and
the movable mechanism is configured to individually move each of the first seat back side support portion and the second seat back side support portion and is also configured to individually move each of the first seat cushion side support portion and the second seat cushion side support portion.

10. The conveyance seat according to claim 8, wherein:
the seat cushion side support portion has a cushion side support surface that is positioned on the same side as the occupant seated on the conveyance seat;
the back side support surface of the seat back side support portion is curved forward toward ends of the back side support surface in the width direction of the conveyance seat; and
the cushion side support surface of the seat cushion side support portion is curved upward toward ends of the cushion side support surface in the width direction.

11. The conveyance seat according to claim 8, wherein:
the pelvis support member includes a connection portion that connects the seat back side support portion and the seat cushion side support portion;
the movable mechanism is configured to move the pelvis support member so that at least one of the seat back side support portion and the seat cushion side support portion is rotated around an axis along the width direction of the conveyance seat with the connection portion as an origin; and
a length of the connection portion in the width direction of the conveyance seat is shorter than a length of the seat back side support portion in the width direction and is also shorter than a length of the seat cushion side support portion in the width direction.

12. The conveyance seat according to claim 8, wherein:
the pelvis support member includes a connection portion that connects the seat back side support portion and the seat cushion side support portion;
the seat cushion side support portion has a cushion side support surface that is positioned on the same side as the occupant seated on the conveyance seat; and
the movable mechanism includes:
  a first movable mechanism configured to move the pelvis support member so that at least one of the seat back side support portion and the seat cushion side support portion is rotated around the axis along the width direction of the conveyance seat with the connection portion as an origin; and
  a second movable mechanism configured to move the pelvis support member so that end regions, in the width direction, of at least one of the back side support surface and the cushion side support surface are moved inward in the width direction.

13. The conveyance seat according to claim 8, wherein:
the seat back includes a pressure receiving member that is elastically deformable to be displaced backward by being pressed by a back of the occupant when a backward load acts on the occupant;
the movable mechanism is fixed to the pressure receiving member;
the seat back side support portion is attached to the movable mechanism; and
the movable mechanism and the seat back side support portion are integrally moved backward along with the pressure receiving member when the backward load acts on the occupant.

14. A conveyance seat comprising:

a seating portion having a seat back and a seat cushion;

a pelvis support member arranged in the seating portion and configured to support a portion of an occupant's body where a pelvis is positioned; and a movable mechanism configured to move the pelvis support member, wherein:

the pelvis support member includes:

a seat back side support portion arranged in the seat back and positioned behind a back portion of the occupant;

a seat cushion side support portion arranged in the seat cushion and positioned below buttocks of the occupant; and a connection portion that connects the seat back side support portion and the seat cushion side support portion; and the movable mechanism is configured to move the pelvis support member so that a position of at least one of the seat back side support portion, the seat cushion side support portion, and the connection portion is changed with respect to the portion where the pelvis is positioned;

the seat back side support portion and the seat cushion side support portion respectively have a back side support surface and a cushion side support surface, each of which is positioned on the same side as the occupant seated on the conveyance seat; and the movable mechanism includes:

a first movable mechanism configured to move the pelvis support member so that at least one of the seat back side support portion and the seat cushion side support portion is rotated around the axis along the width direction of the conveyance seat with the connection portion as an origin; and a second movable mechanism configured to move the pelvis support member so that end regions, in the width direction, of at least one of the back side support surface and the cushion side support surface are moved inward in the width direction.

15. The conveyance seat according to claim 14, wherein:

the seat back side support portion includes a sensor that detects an inclination angle of one of the seat back side support portion and the seat cushion side support portion with respect to the other and outputs a signal in accordance with the inclination angle; and the sensor is installed in a central region of the back side support surface in a width direction of the conveyance seat.

16. The conveyance seat according to claim 14, wherein:

the back side support surface of the seat back side support portion includes a recessed region that is formed on a portion of the back side support surface at a position recessed deeper than a peripheral region of the recessed region;

the seat back side support portion includes a sensor that detects an inclination angle of one of the seat back side support portion and the seat cushion side support portion with respect to the other and outputs a signal in accordance with the inclination angle; and the sensor is installed in the recessed region.

17. The conveyance seat according to claim 14, wherein:

the seat back side support portion is divided into a first seat back side support portion positioned on one end side in the width direction of the conveyance seat and a second seat back side support portion positioned on an other end side;

the seat cushion side support portion is divided into a first seat cushion side support portion positioned on the one end side in the width direction and a second seat cushion side support portion positioned on the other end side; and the movable mechanism is configured to individually move each of the first seat back side support portion and the second seat back side support portion and is also configured to individually move each of the first seat cushion side support portion and the second seat cushion side support portion.

18. The conveyance seat according to claim 14, wherein:

the back side support surface of the seat back side support portion is curved forward toward ends of the back side support surface in the width direction of the conveyance seat; and the cushion side support surface of the seat cushion side support portion is curved upward toward ends of the cushion side support surface in the width direction.

19. The conveyance seat according to claim 14, wherein:

the movable mechanism is configured to move the pelvis support member so that at least one of the seat back side support portion and the seat cushion side support portion is rotated around an axis along the width direction of the conveyance seat with the connection portion as an origin; and a length of the connection portion in the width direction of the conveyance seat is shorter than a length of the seat back side support portion in the width direction and is also shorter than a length of the seat cushion side support portion in the width direction.

20. The conveyance seat according to claim 14, wherein:

the seat back includes a pressure receiving member that is elastically deformable to be displaced backward by being pressed by a back of the occupant when a backward load acts on the occupant;

the movable mechanism is fixed to the pressure receiving member;

the seat back side support portion is attached to the movable mechanism; and the movable mechanism and the seat back side support portion are integrally moved backward along with the pressure receiving member when the backward load acts on the occupant.

\* \* \* \* \*